(12) United States Patent
Huber et al.

(10) Patent No.: US 6,301,044 B1
(45) Date of Patent: Oct. 9, 2001

(54) APPAREL COLOR AND IMAGE EFFECT SYSTEM

(75) Inventors: Mark J. Huber, Burbank; Amy Van Gilder, Glendale; Eric C. Haseltine, Burbank; Alfredo Ayala, West Covina, all of CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/538,651

(22) Filed: Mar. 30, 2000

(51) Int. Cl.[7] .............................. G02B 5/30; G03B 21/14
(52) U.S. Cl. .................. 359/483; 359/465; 359/489; 359/501; 353/20; 472/61
(58) Field of Search ........................... 359/465, 483, 359/489, 494, 500, 501, 443, 446; 353/20; 472/57, 61, 72

(56) References Cited

U.S. PATENT DOCUMENTS 4,928,123 * 5/1990 Takafuji ................................. 353/20
5,793,470 * 8/1998 Haseltine et al. ..................... 353/20

* cited by examiner

Primary Examiner—Darren Schuberg
(74) Attorney, Agent, or Firm—Oppenheimer, Wolff & Donnelly; Christopher Darrow

(57) ABSTRACT

A system for producing a visual effect at a surface of apparel worn by a performer including: a latent image projector which projects light comprising polarizer-encoded latent visual information, such as a color and/or an image, enabling the visual effect, the light being projected along a light path onto the apparel and reflected therefrom toward a viewer along the light path; an analyzer positioned so as to impinge upon the light path and be intercepted by the projected light no sooner in the travel of the light along the light path than substantially at the surface of the apparel; and a polarization maintaining reflective material positioned substantially at the surface of the apparel, whereby the polarizer-encoded latent visual information is resolved by the analyzer no earlier than substantially at the surface of apparel worn by the performer, so that the visual effect is perceived by the viewer at the surface of the apparel but not on other surfaces which do not comprise polarization maintaining reflective material.

82 Claims, 14 Drawing Sheets

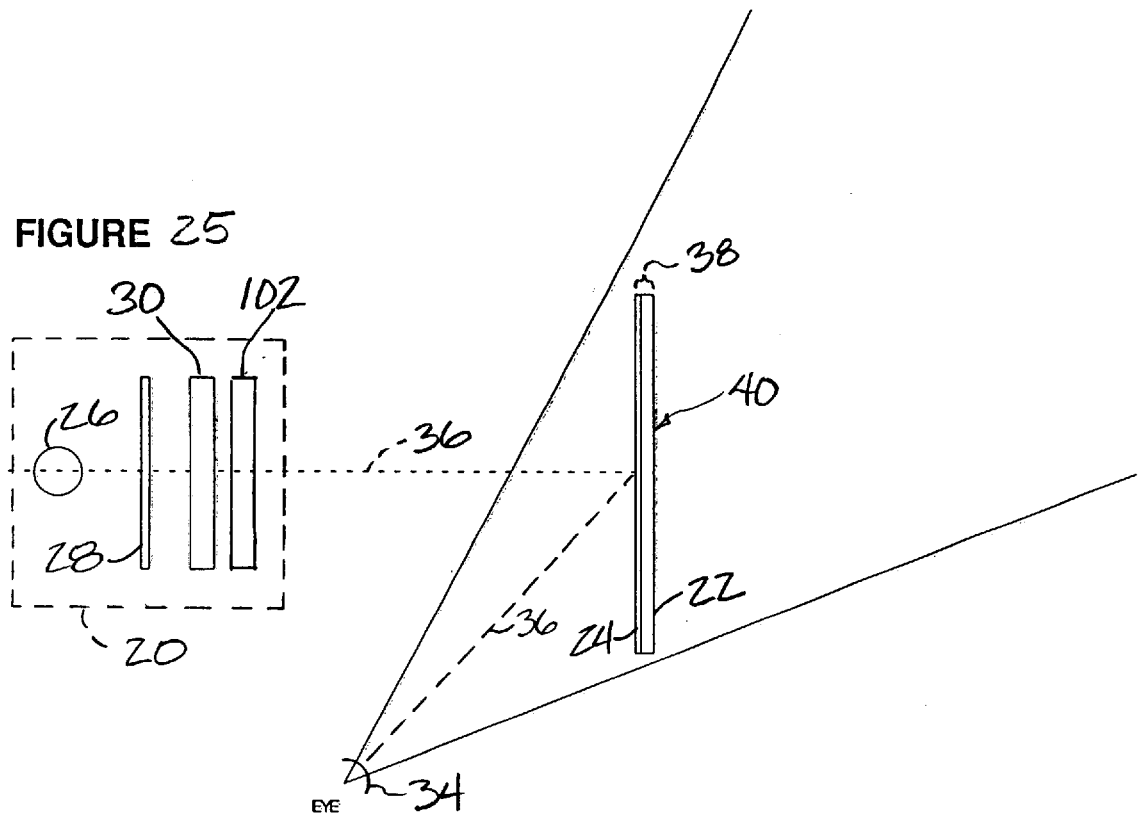
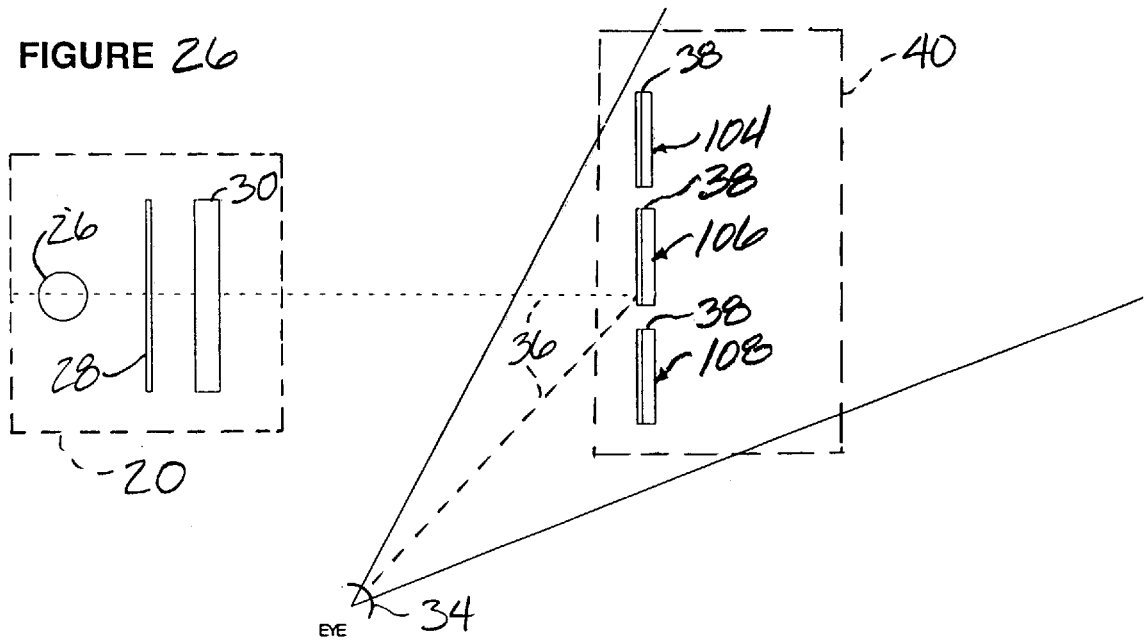

APPAREL COLOR AND IMAGE EFFECT SYSTEM

BACKGROUND OF THE INVENTION

1. Field of the Invention

The invention generally relates to special effects for stage, other live action entertainment applications or stationary applications. More specifically, the invention relates to a system for producing a visual effect comprising color and/or imagery on apparel worn by a performer, as well as props carried by a performer or other related surfaces at the location of the performance. The effects may be produced on non-apparel surfaces such as floors or walls, whether during a live performance or not. The effects may also be produced on stationary, inanimate objects such as statues and sculptures.

2. Description of the Related Art

In certain circumstances, for example in producing a visual effect in a live performance, it is desirable to project visual information by means of light onto apparel worn by one or more performers, or onto props carried by the performers. This could include, for example, making the color of the performer's apparel appear to change color. In another example, a pattern of light and dark, which can be turned on and off or changed, may be desired. Still photo, motion picture, or video imagery may be desired to be projected onto the performer's clothing, or other surfaces such as walls, floors, statuary, sculptures as well as the other forms of images, all comprising visual information.

For all purposes relating to this application "visual information" will be defined as all types and kinds of information transmissible by projected light and perceivable by a viewer, or which can be made perceivable by manipulation of the light before it reaches the viewer, including, but not limited to: a change in intensity of perceived light, a single color; multiple colors; patterns of light and patterns of colored light, still and motion picture images; video and other pixeled images; anaglyphic images, including those enabling a three dimensional effect to be perceived on a surface, written information and other data; and image animation. Some of these types and kinds of visual information will be discussed separately and specifically, but it is intended that the concept of what comprises "visual information" be broadly interpreted. For example almost any perceptible attribute or change in an attribute of light impinging upon the eye of a viewer can potentially convey at least a part of conveyed visual information. It does not itself need to be directly cognizable by the viewer. In this context, another example of what visual information can be is time-sequential, periodic, light polarization plane orientation angle changes occurring rapidly to very infrequently, as these can be used for example in providing timing data and/or cues for coordination of events in a performance. "Visual effect" is a term of art, and all meanings which it has in the art will herein be invoked, as well as any other projection of light comprising visual information. "Anaglyphic" is defined to include all methodologies for producing a three-dimensional visual effect including, but not limited to polarization separation, and color separation, of right and left eye images. "Viewer" will be understood to include not only persons viewing the visual effect directly, but also image capture devices such as still, motion picture and video cameras, and other light receiving and transmitting devices making the effect perceptible indirectly. "Image" will be understood to include all its customary meanings in this context, and will include but not be limited to: all forms of motion picture, video, photographic, animation, pictorial and graphic visual information, which is, or can by manipulation be made, visible, and can comprise for example a black, white or single color field, a pattern of light having contrast between different portions, including a likeness or representation of a person, animal, pattern, abstract composition, writing, or object or thing.

The problem addressed is illustrated by a desire to produce a visual effect on apparel worn by a performer or upon stationary objects such as wall or floor surfaces, statuary, sculptures or other two or three dimensional surfaces, whether live or inanimate. The idea of producing changeable color and/or graphic and pictorial imagery on clothing worn by a person or on other surfaces has been known for several decades. There have been two different conventional approaches. In one approach video image producing devices are placed on a person or object. In the other approach video or film images are directed through an optical system and projected onto the person or object.

In the first-mentioned approach a video producing device, such as an LCD panel, is placed on the clothing. This approach entails electrical devices being placed on a person, usually with associated electrical cables. One of the problems with this approach is that electrical equipment, connectors, cables, batteries, power and signal supply cables from a remote source, and the electrical voltages associated with these devices, are directly placed about the body of the performer. This can be both hazardous and unwieldy.

The other approach is to project color and/or imagery onto a person, object, or surface, using a light such as a spotlight, or projecting a still or motion picture, recorded or live video and the like, onto the performer(s) or object. A problem with this technique is that the imagery appears on all surfaces impinging on the projected light. In short, the imagery appears on the object, as intended, but also the exposed skin and hair of a performer, or unintended surfaces on other two or three dimensional objects as well as on the background. Highly reflective clothing can be used, for example, and a non-reflective background and makeup, to minimize this "blow by" image being perceived other than on the apparel or other surface where intended. However, the color or image projected will still appear on these surfaces to some extent, particularly the face and hands of the performer if exposed. Also, using a non-reflective background conventionally precludes combination of the effect with background visuals other than black surfaces adjacent the performer(s). Moreover, a black background is usually not completely non-reflective, and so some projected color or image may be discernible to a viewer or an audience.

SUMMARY OF THE INVENTION

It has been recognized that it would be advantageous to be able to create a visual effect comprising visual information discernible on clothing worn by a live performer or surfaces of inanimate objects without projecting a discernible visual effect onto the person's skin or hair or undesired surfaces or surroundings. The first challenge addressed is to be able to change the color of a person's clothing from a distance, without the use of electrical cables and the like on the person of the performer. The system should be capable of changing the color(s) of all of the clothing, or any part of the clothing, without changing the color of the actors' face, hands, or the floor or background adjacent the person. The second challenge addressed is to deliver light patterns, motion or still picture, or live video imagery, or other visual information, onto a person's clothing without the use of electrical cables or having high electrical voltages present on the person.

The invention provides a system for producing a visual effect perceptible by a viewer as occurring on a surface such as apparel worn by a performer or other surface. The system comprises a latent visual information projector which projects light comprising polarizer-encoded latent visual information, the visual effect including the visual information projected. The light is projected along a light path onto the apparel or other surface and reflected therefrom toward a viewer along the light path. A polarization maintaining reflective material is positioned substantially at the surface. An analyzer is positioned so as to impinge on the light path and be intercepted by the projected light no sooner in the travel of the light along the light path than substantially at the surface of the apparel worn by the performer or other surface. Whereby the polarizer-encoded latent visual information is resolved by the analyzer so as to be perceptible no earlier than substantially at the surface of apparel worn by the performer or other surface. Light comprising visual information not impinging on the apparel will not be resolved. This is so that the visual effect is perceived at the surface of the apparel or other intended surface but not on other intended surfaces which do not comprise polarization maintaining reflective material, whereby the visual effect is perceived by the viewer to occur on the intended surface such as the apparel worn by the performer, but not another adjacent surface or background surface.

In a more detailed aspect, in one implementation the latent visual information is transmitted by polarization-encoded light and is projected onto clothing that is capable of resolving the light comprising the visual information, which can be a single color, multiple colors, and imagery, as discussed, directly at the surface of the clothing. In this embodiment, a wearable reflective polarizing material is attached directly to the clothing. Any object inserted into the light path, without a reflective polarizing material, will appear to be illuminated by white light. However, any object covered with a reflective polarizing material will show the visual effect comprising the latent color(s) or imagery or other latent visual information hidden in the light projected from the projector.

In another more detailed aspect, implementation can differ in that the color, imagery or other visual information are projected onto a wearable or affixed material capable of maintaining the polarization of the light falling onto and reflected from the wearable polarization maintaining material. The visual information becomes visible when the wearable material is viewed through an analyzing polarizer. Any object inserted into the light path, observed without the use of the analyzing polarizer, will appear to be illuminated by white light. However, when viewed through the analyzing polarizer, any object covered with a polarization maintaining material will show the visual effect comprising visual information as appearing at the surface of the polarization maintaining material, but other surfaces not covered with polarization maintaining material will not show the effect, be it an otherwise non-visible color or image for example, and will appear to be illuminated by white light.

DESCRIPTION OF THE DRAWINGS

FIG. 25 is a schematic diagram of a visual effect system in another embodiment;

FIG. 26 is a schematic diagram of a visual effect system in another embodiment;

DETAILED DESCRIPTION OF THE INVENTION

Figure 1:
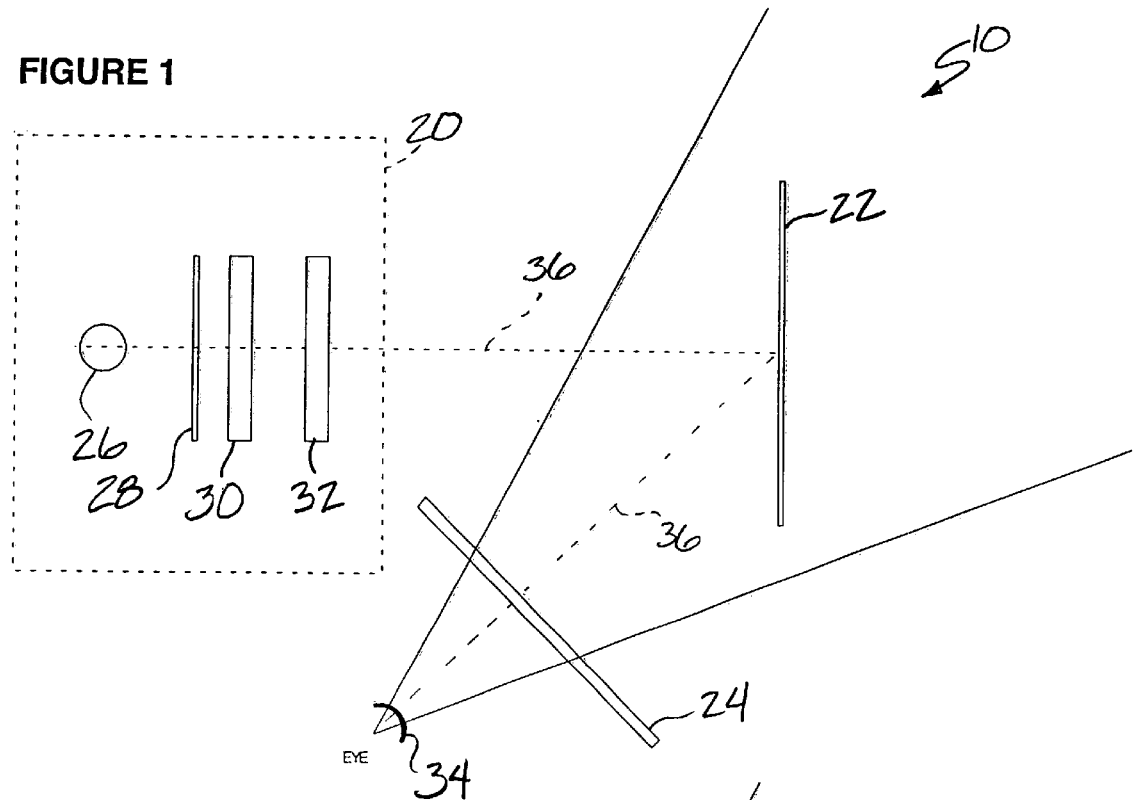
FIG. 1 is a schematic diagram of a visual effect system in one embodiment in accordance with principles of the invention.

With reference to the drawings, which are given by way of illustration and not by way of limitation of the scope of the invention, FIG. 1 illustrates schematically a visual effect system, in this embodiment a latent color projection system 10. The system comprises a latent color projector 20, a wearable polarization maintaining material 22, and an independent polarizer (called the polarizing analyzer), or analyzer 24. The latent color projector is comprised of a light source 26, a plane polarizer, called the pre-polarizer 28, a birefringent material element 30, and an optional projection lens 32.

Latent Color Projectors

In the latent color projector 20, natural, non-polarized light rays from the light source 26, which are made essentially parallel to one another, impinge on the pre-polarizer 28. These parallel light rays, in passing through the pre-polarizer, become plane polarized in the privileged direction of the pre-polarizer. In a plane polarized light ray, the electric vector ("e-vector") of the light ray is composed of two, in phase, identical frequency, and orthogonal components. A plane polarized light ray can be discussed in terms of either these two components, or as the vector sum of these two components. When a plane polarized light ray is discussed in terms of the vector sum of the two components, it is visually thought of as a 'wave' constrained to a single plane of oscillation. This single plane of oscillation is called the privileged plane of the pre-polarizer.

For simplicity in this discussion, the light source will be discussed as if it were a monochromatic light, that is light of only one frequency. It will be understood however, that the light source is one which projects light of multiple wavelengths, comprising at least those perceivable by the viewer 34 as the range of colors desired for the system. Light of wavelengths that are not perceptible by humans can be included, such as infrared. Such light can be used for other purposes, for example timing and cue signaling as before mentioned, when not intended to be seen by audience viewers. Such light could be "seen" by other viewers such as electronic equipment and/or actors and technicians wearing special glasses, for example, to trigger events and effects, which in turn are seen by the viewers in the audience or by a camera or other device capturing the effect. Examples of light sources that have been used include a Dersken Visual Impact System Lighting Instrument, made by Derksen Lichttechnic of Germany, using a GL 200 MSD lamp. Another light source is a Source Four Ellipsoidal Lighting Instrument manufactured by Electronic Theater Controls, which has a place of business in Glendale Calif. The lamp used with the latter is an Osram Halogen Photo Optic Lamp, part number BTL 500W 120V P28s NAED 54685 available from Osram Corporation of Winchester Ky.

Plane polarized light from the pre-polarizer (28) then impinges on the birefringent material (30). At the surface of the birefringent material the two components of the plane polarized light ray are exactly in phase with one another. As the two components move through the birefringent material, the phase relationship between the two components can be changed due to a process called retardation. Retardation is caused by the physical interaction between the birefringent material and the two components of the plane polarized light ray.

Birefringent materials are transparent substances that exhibit at least two indices of refraction. Birefringent materials have structures that are chemically or physically asymmetric. This asymmetry manifests as different indices of refraction as a function of the direction of vibration, of a light ray, in that material. The vibration directions defined by these indices of refraction can be at any non-zero angle in relation to each other. Vibration directions that fall between these two extremes exhibit intermediate indices of refraction. The maximum birefringence of the substance is the numerical difference between the highest and lowest index of refraction value found in the substance. Birefringent materials typically exhibit at least one direction of propagation through the material in which all vibration directions have the same index of refraction. This special case is called the optic axis of the material. In a generalized case, these birefringent materials 30 are considered to have parallel surfaces, normal to the light path 36 with a uniform thickness and a uniform (non-zero) birefringence across the active area of the material.

The two components of a plane polarized light ray will generally experience different indices of refraction upon entering the birefringent material. In this case, one of the components (called the O-ray) takes a path through the material where the direction of propagation of the component is perpendicular to the wave front normal of the wave. In this case the O-ray travels straight though the birefringent material. The other component (called the E-ray) moves along a direction which is not perpendicular to the wave front normal. In this case the E-ray moves at an angle to the perpendicular direction through the material. The O-ray and the E-ray therefore take different directions through the material.

The indices of refraction that the O-ray and E-ray will experience are dependent on the orientation of the plane polarized light ray as it impinges on the birefringent material. In an ideal case, the O-ray and the E-ray could coincidentally align with the maximum and minimum vibration directions of the material. In this case the O-ray would experience either the maximum or minimum index of refraction of the material, while the E-ray would experience the other extreme index of refraction value. In a more general case, the O-ray and the E-ray could align with any of the intermediate indices of refraction. In this case, the indices of refraction experienced by the O-ray and the E-ray would be intermediate values between the two extremes. Finally, in the special case where the propagation direction of the plane polarized light ray is along the optic axis of the material, the O-ray and the E-ray experience exactly the same index of refraction, and the material does not exhibit the property of birefringence.

The fact that the O-ray and the E-ray experience different indices of refraction and different travel directions through the material allows the phase of one component to be changed in respect to the other component. Since the velocity of light in a medium is a function of the index of refraction, it follows that the velocities of the O-ray and the E-ray will be different in the material if they experience different indices of refraction. Since the O-ray and E-ray take different paths through the material it follows that the path lengths can be different. Given both a velocity and a path length difference, it follows that the phase of one of the components can be changed in respect to the other component. In short, if the two components of the plane polarized light ray start out in phase at the first surface of the birefringent material, then the phase relationship between the components can be changed by the time both components travel through the material.

The phase difference between the two components defines the type of polarized light that will be emitted from the second surface of the birefringent material. If the two components are in phase at the second surface of the birefringent material, then there is a zero phase difference and the light ray passes through the material without any change in polarization state. The emitted light will still be plane polarized with a polarization angle parallel (0 Degrees) to the privileged direction of the pre-polarizer. The birefringent material in this case is called a full wave retarder. If the two component light rays are 180 degrees out of phase at the second surface of the material, then the transmitted light will be plane polarized with a polarization angle non-parallel (not 0 Degrees) to the privileged direction of the pre-polarizer. The birefringent material in this instance is called a half wave plate. If the two components are in any other phase relationship with one another, the resultant electric vector of the emitted light will rotate rather than stay in a single plane of oscillation. In these cases, the emerging light is no longer plane polarized. In the special case where the e-vector is rotating and the amplitudes of both components are identical, the emerging light ray is circularly polarized. In this instance, the birefringent material is called a quarter wave plate. In all other cases, where the e-vector is rotating and the amplitudes of the components are not identical, the emerging light is elliptically polarized.

Since the index of refraction of a birefringent material 30 varies with the wavelength of incident light, the phase difference between the contributing components at the second surface of the birefringent material is also wavelength dependent. Given a broad spectrum light source 26 and a specific birefringence, each wavelength of light transmitted from the latent color projector could theoretically have a unique angle of its plane of polarization with reference to the privileged plane of polarization of the pre-polarizer. In this context, the system would be capable of outputting specific frequencies of light at very specific angles in reference to the privileged plane of the pre-polarizer. However, most birefringent materials do not act in such a well-behaved, orderly and predictable fashion. This means that the color tuning of the system is still very much an art. The light emerging from the birefringent material will be referred to as being polarization encoded. The polarization-encoded light can then be passed through the optional projection lens.

In the above discussion, the term pre-polarizer has been used to refer to a linear polarizer. In the same discussion, the text reads as if there is an air gap between the pre-polarizer and the birefringent material. At this point it is important to recognize that the pre-polarizer can actually be of two types. The pre-polarizer can be a linear polarizer as discussed above, or it can be a circular polarizer. As is immediately clear, a circular polarizer is nothing more than a linear polarizer and a ¼ wave retarder plate bonded together at a specific angle.

In the above discussion, birefringent materials were discussed as if they were a single element in the system. At this point it is important to realize that more than one birefringent material can be stacked up to form a series of birefringent materials. The benefit of multiple birefringent materials is two fold. In the first case, it provides greater control of the color range of the system. As an example, a full wave retarder plate is typically limited to two colors. The insertion of a second optically active substance can allow you to increase this pallet of color. In the second case, it provides greater control of the rate at which colors can be changed. In this context, with the full wave retarder plate, a color and its compliment are separated by 90 degrees. The insertion of a second retarder into the system allows a change in this angle of separation and hence the speed at which a color change occurs.

In the above discussion, birefringent materials were discussed as if all materials of this type were planer in cross section. At this point is important to realize that any birefringent material can be used as an optical element in this system. This includes standard optical wedges as well as non-traditional optical elements such as spheres, spoons and even transparent dinner plates. In some instances, broken and non-functional LCD panels, which have had the analyzer pulled off, can also be used.

In the above discussion, birefringent materials were discussed as if the best materials were quarter wave, half wave and full wave retarders. At this point it is important to realize that the best color systems found to date are not limited exclusively to readily available scientific retarder plates. The best system found to date is composed of a linear polarizer, a quarter wave plate, and two ⅛-inch pieces of a polycarbonate material of the brand name Lexan. In this context, the two pieces of polycarbonate do not have identical optical properties, but in combination they generate the best color though the system.

Continuing discussion of the latent color projection system 10, the polarization encoded light rays from the latent color projector 20 are focused onto the surface of a wearable polarization maintaining material 22. The polarization encoded light rays are reflected off of the polarization maintaining material, where they travel through the air and through the analyzer 24 and eventually reach the viewer 34. An exemplary path 36 of the light rays as they travel as just described is shown.

In this system, the angle of the plane of polarization of the analyzer, with respect to the privileged direction of the pre-polarizer, can be any angle desired. In this orientation, only those plane polarized light rays with planes of polarization rotated sufficiently by the birefringent material to match those of the analyzer can pass through the analyzer.

In this latent color projection system 10, the viewer 34 perceives a resolved, single (visible) color on the surface of the wearable polarization maintaining material 22. In order to change the color over the multiple colors from the latent color system, the planes of polarization of one or more of the various optical elements 28, 30, 24 can be changed dynamically in respect to the other optical elements. The polarization encoded light appears as simple white light on any other material inserted into the path of the polarization encoded light rays.

In one embodiment, the angular relationship between the planes of polarization of the pre-polarizer 28, the birefringent materials 30 and the analyzer 24 are established once and remain fixed. In general, it is best to set the plane of polarization of the analyzer to be either parallel (0 degrees) or perpendicular (90 Degrees) to the privileged direction of the pre-polarizer. In this embodiment, the viewer 34 perceives a resolved (visible) color on the surface of the wearable polarization maintaining material. This is a single latent color projection system, in that the system is only capable of projecting one color through the fixed optical elements. When the light from the light source is allowed to fluctuate through time, the latent color can be made to appear and disappear. The light appears as simple white light on any other material inserted into the path of the polarization encoded light rays.

In another embodiment, the angular relationship between the planes of polarization of the pre-polarizer 28 and the analyzer 24 is allowed to change through time and the birefringent materials 30 are deleted from the light path. In this latent color projection system, when the planes of polarization of the pre-polarizer and the analyzer are parallel (0 degrees), the eye perceives white light on the surface of the polarization maintaining material 22. When the planes of polarization of the pre-polarizer and the analyzer are perpendicular (90 degrees), all light is blocked from traveling through the analyzer, and the eye perceives no light on the surface of the polarization maintaining material. Therefore, the viewer 34 perceives resolved black (no light) and white (maximum light) on the surface of the wearable polarization maintaining material. The light appears as simple unchanging white light on any other material inserted into the path of the polarization encoded light rays.

In another embodiment of the invention, the angular relationship between the planes of polarization of the birefringent materials 30 and the analyzer 24 are established once and remain fixed. However, the angular relationship between the planes of polarization of the pre-polarizer 28, with respect to the planes of polarization of the other optical elements, is allowed to change. In this orientation, only those plane polarized light rays with planes of polarization rotated by the birefringent material to match those of the analyzer can pass through the analyzer. In this latent color projection system 10, the eye perceives a changing resolved (visible) color on the surface of the wearable polarization maintaining material 22. This changing color is a function of the change in the angle of the plane of polarization of the pre-polarizer. This is a multiple latent color projector, in that the system is capable of projecting more than one color, at different times, through the optical elements. The color seen by the viewer will change upon rotation of the pre-polarizer. The light appears as simple unchanging white light on any other material inserted into the path of the polarization encoded light rays.

In another embodiment of the invention, the angular relationship between the planes of polarization of the pre-polarizer 28 and the analyzer 24 remain fixed. Again, it is best to set the plane of polarization of the analyzer to be either parallel (0 degree) or perpendicular (90 degrees) to the privileged direction of the pre-polarizer. The angular relationship between the planes of polarization of the birefringent materials, with respect to the planes of polarization of the other optical elements, is allowed to change. In this latent color projection system, the viewer 34 perceives a changing resolved (visible) color on the surface of the wearable polarization maintaining material. This changing color is a function of the change in the angle of the plane of polarization of the birefringent materials. This too is a multiple latent color projector, in that the system is capable of projecting more than one color, at different times, through the optical elements. Otherwise the system is the same as the previously described embodiment.

In another embodiment the angular relationship between the planes of polarization of the pre-polarizer 28 and the birefringent materials 30 remain fixed. However, the angular relationship between the plane of polarization of the analyzer, in respect to the planes of polarization of the other optical elements, is allowed to change. The viewer 34 perceives a changing resolved (visible) color on the surface of the wearable polarization maintaining material 22. This changing color is a function of the change in the angle of the plane of polarization of the analyzer. Otherwise the system is as before described.

Since the color observed on the wearable polarization maintaining material 22 is a function of the relationship between the angles of the planes of polarization of the pre-polarizer 28, the birefringent materials 30 and the analyzer 24, any method which changes the relationship between these angles can be used to make a latent color projection system where the color is changeable. The possible methods that could be used include: a) mechanical rotation of the pre-polarizer, or the birefringent materials or the analyzer, or any combination of the above, the axis of rotation being centered or off-centered, parallel or non-parallel with the light path; b) mechanical gobo wheel technologies for the insertion of birefringent or polarized disks into the beam path; c) multiple elements of birefringent materials inserted into the light path; d) the deflection or twisting of a birefringent material relative to the light path about axes not parallel to the light path, for example an axis perpendicular to the plane of the birefringent material and the direction of the light path; e) the insertion of birefringent wedges into the light path, the color varying with wedge position; and f) electrically active birefringent materials such as liquid crystal devices in the light path.

There are many possibilities for implementation of the system, some illustrative examples include inserting a pre-polarizer 28 and a birefringent material 30 between the light source 26 and a projection lens 32 of a theatrical lighting instrument. The polarization encoded light projected will appear as white light unless it is viewed through the analyzer 24, either directly or as reflected from a polarization maintaining material 22. Both the pre-polarizer and the birefringent material can be made rotatable for changing the latent color projected as discussed above. In another embodiment the pre-polarizer and birefringent material are inserted in a beam path 36 projected from a hand-held flashlight, held in place by structure attached to the flashlight, so the flashlight can be freely carried and aimed. Otherwise the flashlight embodiment functions as the theatrical lighting instrument. In another embodiment the pre-polarizer and birefringent material are inserted between the light source and projection lens of an overhead lighting projector. The mirror in the overhead projector is a polarization maintaining mirror. Otherwise this embodiment functions as before described. As will be appreciated a number of polarization maintaining mirrors can be inserted in the light path 36 to direct the polarization encoded light to where it is desired.

Moreover, the analyzer 24 can be provided in several ways. The analyzer can be incorporated in glasses worn by the viewer, or can be incorporated in a window or a transparent screen, or a similar structure through which the viewer looks to perceive the polarization maintaining reflective material 22. The polarization maintaining reflective material is illuminated by polarization encoded light traveling along the light path 36 from the projector and which does not pass through the analyzer until after reflecting from the polarization maintaining material.

In the above discussion and examples the polarization-encoded light rays projected have been referred to as appearing "white" when unresolved. In actuality, the color of the light varies as a function of the nature of the light source as modified by the other optical elements in the system. The projected light often acquires a slight blue or green color due to inherent properties of the polarizing filters. The color of the unresolved projected light can be modified also. In one embodiment a non-birefringent non-polarizing color filter or gel can be placed in the light path 36. The placement of the color filer can be between the light source 26 and the eye of the viewer 34 at any location before, after or between the system elements 28, 30, 32, 22, 24 respectively.

The birefringent materials used in the above discussion and examples, and as used in the following discussion and examples, come in three types. First, standard scientific materials, such as wave retarders, are generally useful for a limited color pallet with specific interference colors. A quarter wave retarder, for instance, allows a transition from a pale blue to a pale yellow color. On the other hand, a second type, comprising sheets of polymeric resin, can be used. Pieces of inexpensive LEXAN (a trademark of General Electric Corp.), a widely available polycarbonate material, generate the best colors to date. Lexan allows transitions from dark blues to purples to deep yellows and apple greens. Some of the more interesting looks can be generated using a third type comprising pieces of extremely inexpensive plastic plates, glasses and dinner utensils. Materials of this type generally create multiple colors in a rainbow like effect. In this context, the cheaper the materials, the better the effect. The uniformness of the birefringent material is a factor. In instances where the birefringence of a birefringent material is not uniform across the active area of the material, the perceived color on the wearable polarization maintaining material is also not uniform. A blotchy color effect is possible with such inexpensive plastic materials These inexpensive plastic materials can be clear or transparently colored.

Figure 2:
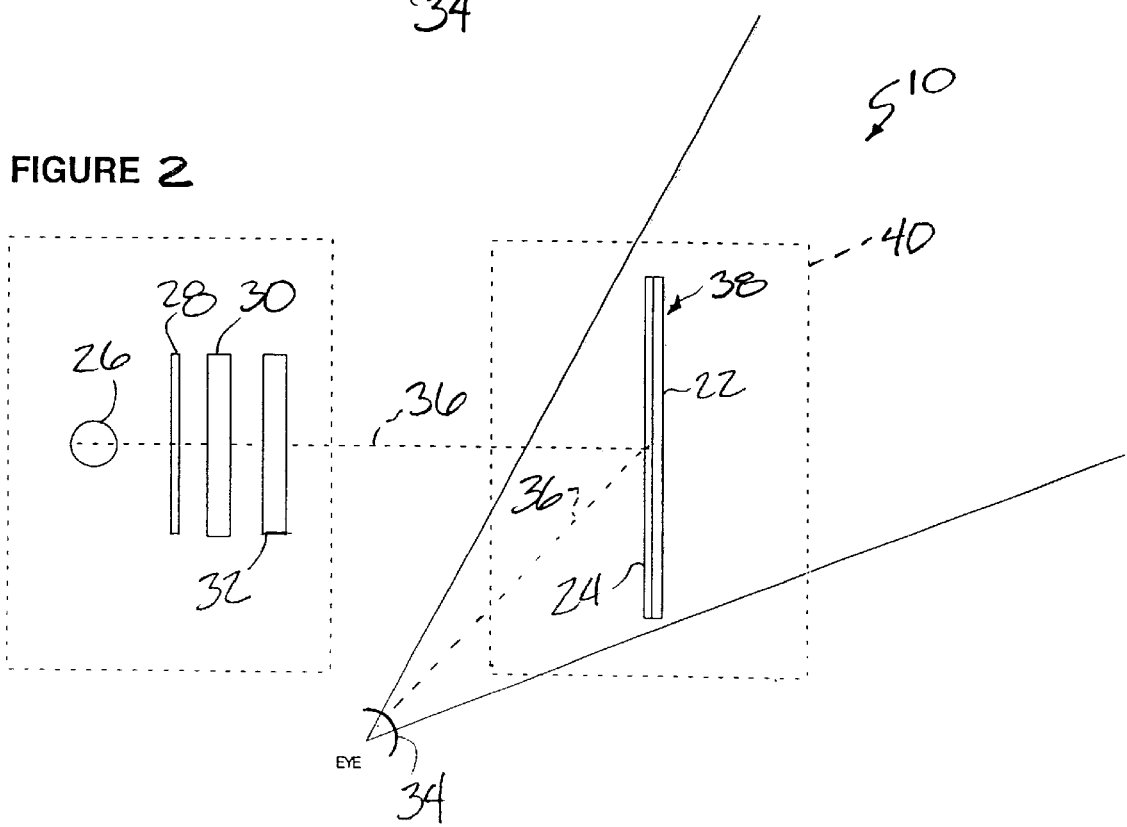
FIG. 2 is a schematic diagram of a visual effect system in another embodiment.

With reference to FIG. 2, in another embodiment the latent color projector 20 is as before described, and like reference numbers refer to like components of the system 10, but the polarization maintaining reflective material 22 and the analyzer 24 are both positioned at a surface to be viewed, such as the surface of apparel of a performer. They can be joined as a laminated construction comprising a reflective polarizer 38 incorporated in a wearable reflective polarizing material 40. The polarization encoded light is projected and manipulated as before described, except that the light is resolved at the wearable reflective polarizing material; and, accordingly, a separately positioned analyzer is unnecessary. Viewers are able to look directly at the wearable reflective polarizing material 40 and see resolved color there. The laminate could be mounted on other objects, such as props carried by performers, or which are stationary, or on background and foreground surfaces on the stage, on statuary, sculptures, walls or floors to name a few examples.

The latent color projection system 10, in this embodiment works essentially as discussed above in connection with an embodiment where the analyzer 24 is a separate component of the system. This includes the discussions about the relative orientation and rotating the planes of polarization of the various elements of the system. The differences include the fact that the analyzer is a part of the reflective polarizing material 40 which can be incorporated in the apparel of a performer. While different orientations of the plane of polarization of the analyzer can be used as will be discussed below, the analyzer is generally not rotated unless the reflective polarizing material rotates. This itself can be used as an effect, as the surface of the apparel to which the material is attached will appear to change color locally as the apparel moves. As an example, a performer could do a cartwheel and the resolved color of the apparel, will appear to change as the performer rotates about an axis which is roughly parallel to the light path 36, or at least is not perpendicular to the light path 36. Likewise, spinning props can be made to appear to change color.

Another difference is that the light path will go through the analyzer twice. In one embodiment the wearable reflective polarizing material 40 comprises an analyzer 24 layer formed of a polarizing material, and a polarization maintaining reflective material 22 layer formed by laminating or coating the material on the back side of the analyzer layer. Light rays traveling along the path 36 of the light will pass through the analyzer to the polarization maintaining reflective material where it is reflected and passes back through the analyzer in the opposite direction. The polarization maintaining material 22 is effective at reflecting the light with minimal rotation of the planes of polarization, otherwise the reflected light passing back through the analyzer again will be diminished.

In one embodiment, the wearable reflective polarizing material 40 comprises many pieces of wearable reflective polarizer 38 attached to the apparel of a performer. The planes of polarization of the analyzers 24 on each of the pieces of wearable reflective polarizers are oriented parallel to each other, with a known angle (0–90 degrees) with reference to the privileged direction of the pre-polarizer 28 in the latent color projector 20. As will be appreciated, if the performer rotates the reflective polarizers by body movement the colors perceived by the viewer will change. The performer can be instructed regarding the proper orientation during projection of the latent color to mitigate getting false colors if desired. However, these circumstances can be used to create an effect, for example having the image colors appear to change in response to body movement, rotation of a prop incorporating the reflective polarizing material 40 and the like.

In another embodiment, the wearable reflective polarizing material 40 comprises many pieces of wearable reflective polarizer 38. The planes of polarization of the analyzers 24 on each of the wearable reflective polarizers are oriented randomly in relation to each other and to the privileged direction of the pre-polarizer 28 in the latent color projector 20. In this latent color projection system 10 the viewer 34 perceives a number of differently colored areas, all changing into different colors depending on the functionality of the latent color projector 20.

Figure 3:
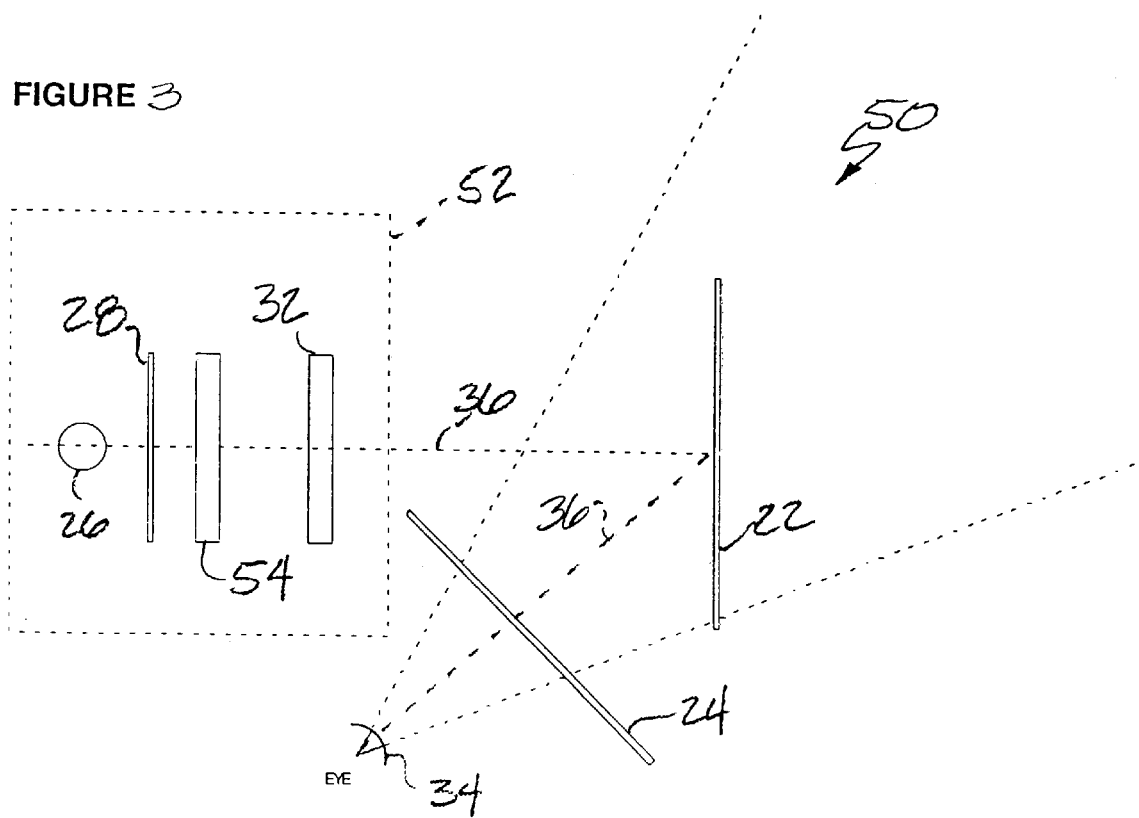
FIG. 3 is a schematic diagram of a visual effect system in another embodiment.

With reference to FIG. 3, which is a schematic diagram of a color and image effect system, in this embodiment a latent video image projection system 50. The system comprises a latent video image projector 52, a wearable polarization maintaining material 22, and an independent polarizer (called the polarizing analyzer), or analyzer 24. The latent video image projector is similar to the color projectors described above and is comprised of a light source 26, a pre-polarizer 28, a projection lens 32, and a transmissive-type liquid crystal (hereinafter LC) matrix 54.

As will be appreciated, the latent video image projector 52 is similar in many respects with respect to the latent color projectors described above, and like elements of the system are referred to with like reference numbers. Light rays from the light source 26, essentially parallel to one another, impinge on, and pass through, the pre-polarizer 28; where they become plane polarized in the privileged direction. As this plane polarized light passes into the LC matrix 54, the polarized light passes through individual pixels. A video signal applied to the pixels induces electric fields that rotate the planes of polarization of the light traveling through the individual pixels. In this way, the video imagery from the video signal is polarization encoded onto the light rays moving through the LC matrix. This rotated plane-polarized light then passes through the projection lens 32. Light, containing a latent image, is projected along a light path 36 onto a polarization maintaining reflective material 22, which is incorporated in the apparel of a performer and/or props or other surfaces on stage. The LC devices comprising the matrix 54 are commercially available. The LC devices enable latent image projectors capable of polarization encoding both color and black and white video images. In this embodiment, as well as all embodiments where an image is projected, proper focus of the image on the polarization maintaining reflective material is essential, and depth of field considerations dictate that actors upon whom the image is focused must be instructed in movement, and this coordinated with control of the projector, so that focus of the image can be maintained.

Light rays reflected from the polarization-maintaining reflective material 22 continue along the light path 36 and impinge upon an analyzer 24. Light rays that travel through the analyzer continue on to reach the viewer 34. The plane of polarization of the analyzer is oriented perpendicular to the privileged direction of the pre-polarizer. In this orientation, only those plane polarized light rays that have had their planes of polarization rotated sufficiently to match the orientation of the analyzer by the LC matrix can pass through the analyzer. In this latent video projection system, the eye perceives a resolved (visible) video image on the surface of the wearable polarization maintaining material. The imagery appears as simple white light on any other material inserted into the path of the polarization encoded light rays. The content of the resolved video image can be anything capable of being delivered by a standard video projector. This includes still and motion picture images converted to a video format, live video, still video, pure single colors, anaglyphic information, and other data.

In another embodiment of the invention, the plane of polarization of the analyzer 24 is oriented in a different (non-perpendicular) relation to the privileged direction of the pre-polarizer 28. In this latent video projection system 50, the viewer 34 perceives a false color resolved (visible) video image on the surface of the wearable polarization maintaining material 22. The polarization encoded light still appears as simple white light on any other material inserted into the path of the polarization encoded light rays. The false colors are produced because the LC matrix 54 rotates the plane of polarization of the light rays for each color the right amount so that it will be lined up with the privileged direction of the analyzer, the amount of rotation required being different for each color. Rotating the analyzer shifts the perceived colors an equal amount to the right or left on the color spectrum, depending on which way the analyzer is turned.

In one embodiment the latent video projector 52 is produced by the deletion of the analyzer from the light path 36 of a commercially available video projector which utilizes, in sequence, a light source, a pre-polarizer, one LC matrix, an analyzer and a projection lens. The polarization encoded light rays produced by this projector appear to be white light unless viewed through an analyzer 24. This type of latent image projector is capable of polarization encoding both color and black and white video images. The content of the latent video image can be anything capable of being delivered by a standard video projector, discussed above.

In another embodiment a latent video image projector 52 is produced by the insertion of a pre-polarizer 28 and an LC matrix 54, in sequence, between the light source 26 and the projection lens 32 of an overhead lighting projector. In a latent video projector of this type, the polarization encoded light rays are bounced off of a polarization maintaining mirror (not shown) used to change the direction of the light path and then are passed through the projection lens 32. Otherwise the operation of the projector is as before explained.

In another embodiment of the invention, a latent video projector 52 is produced by the insertion of a pre-polarizer 28 and an LC matrix 54, in sequence, between the light source and the projection lens of a theatrical lighting instrument. The polarization encoded light rays produced by a latent image projector can be bounced off of a polarization maintaining mirror, or mirrors, to direct the polarization encoded light rays where they are needed.

In each of the above-described projectors 52, the polarization encoded light rays traveling from the projector appear as, and have been referred to, as 'white' light. In actuality however, as with the latent color projectors described above, the color of the light is a function of the color of the light source modified by the other optical elements in the system. The light may acquire a slight blue or green color due to the color of the polarizing filters.

In one embodiment, the color of the light traveling through the system 50 is modified by the insertion of a non-birefringent color filter or gel. In this embodiment, the unresolved color of the polarization encoded light rays can be any color desired. This color filter can be inserted at a number of places in the system, such as between the light source 26 and the pre-polarizer 28, between the pre-polarizer and the LC matrix 54, between the LC matrix and the projection lens 32, between the projection lens and the polarization maintaining material 22, between the polarization maintaining material and the analyzer 24, and between the analyzer and the viewer 34. In another embodiment of this invention, a birefringent colored gel or filter can be used instead, and the latent image projected is modified through the use of the birefringent filter or gel and will be resolved as a false color image.

Figure 4:
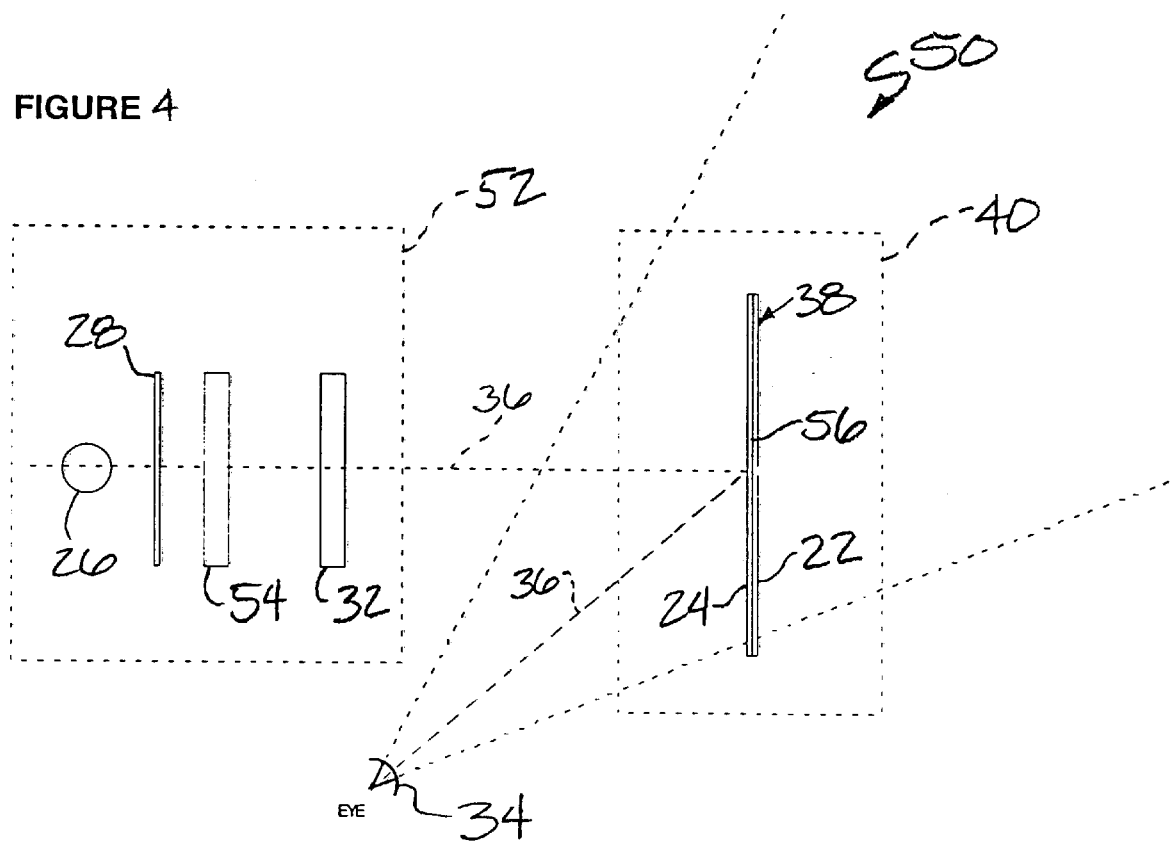
FIG. 4 is a schematic diagram of a visual effect system in another embodiment.

Turning to FIG. 4, in another embodiment the latent video image projection system 50 comprises a latent video projector 52 and a wearable reflective polarizing material 40. As mentioned previously, the material may be applied to other moveable or stationary surfaces as well. The latent video projector is as above described comprising a light source 26, a pre-polarizer 28, a transmissive-type LC matrix 54, and a projection lens 32. The wearable reflective polarizing material comprises a laminated construction comprising a reflecting polarizer 38 including an analyzer 24 and a polarization maintaining reflective material 22, the surface between the layers just described being a polarization maintaining surface 56.

The latent video image projector 52 functions as before described in connection with a system 50 where a separate and independent analyzer 24 is provided. However, in this embodiment the polarization encoded light rays from the latent video image projector are focused onto the surface of a wearable reflective polarizing material 40. A projected latent video image is resolved at the surface of the apparel of the performer which incorporates the wearable reflective polarizing material. The plane of polarization of the analyzer is again oriented perpendicular to the privileged direction of the pre-polarizer 28, and the system works as before described in other respects. Regarding the wearable reflective polarizing material the polarization encoded light rays bounce off of the polarization maintaining surface 56 and back through the analyzer in the way described above in connection with the color projection system used with wearable reflective polarizing material. As a result, the eye perceives a resolved (visible) video image on the surface of the wearable reflective polarizing material. The imagery appears as simple white light on any other material inserted into the path of the polarization encoded light rays.

In another embodiment of the latent video image projection system 50, the polarization encoded light rays from the latent video image projector 52 travel along the light path 36 and are focused onto the surface of a wearable reflective polarizing material 40 and the system to this point functions as before described. However, the plane of polarization of the analyzer 24 at the surface of the wearable reflective polarizing material is oriented non-perpendicular to the privileged direction of the pre-polarizer. In this orientation, the viewer 34 perceives a false color resolved (visible) video image on the surface of the wearable reflective polarizing material, as the difference between the angle of orientation of the analyzer and the 90 degree angle from the privileged direction of the pre-polarizer 28 corresponds to a wavelength shift as discussed above. The LC matrix being configured to rotate the plane of polarization of the light rays through each pixel so as to resolve as true color at 90 degrees, rotation of the analyzer will cause the color to change, which can be used as an effect as discussed above in connection with color projection.

In one embodiment, the wearable reflective polarizing material 40 comprises many pieces of wearable reflective polarizer attached to apparel of a performer. The planes of polarization of the analyzers 24 on each of the pieces of wearable reflective polarizers are oriented perpendicular to the privileged direction of the pre-polarizer 28 in the latent video image projector 52. As will be appreciated, if the performer rotates the reflective polarizers by body movement the colors of the image perceived by the viewer 34 will change. The performer can be instructed regarding the proper orientation during projection of the latent image to mitigate getting false colors if desired, or these circumstances can be used to create an effect, for example having the image colors appear to change in response to body movement, rotation of a prop incorporating the reflective polarizing material 40, and the like.

In another embodiment, the wearable reflective polarizing material 40 comprises many pieces of wearable reflective polarizer, wherein the planes of polarization of the analyzers 24 on each of the wearable reflective polarizers are oriented randomly in relation to the privileged direction of the pre-polarizer 28 in the latent image projector 52. In this latent video image projection system 50, the viewer 34 perceives a jumbled and pointillist effect false color (visible) video image on the surface of the wearable reflective polarizing material.

Other embodiments include the variations described above, including using a color filter or gel, non-birefringent and birefringent, as discussed above, to obtain different colors in the visible non-resolved light projected and/or false colors in the latent video image, which itself can be any of the types of images mentioned above, including a single color. Furthermore, while the wearable reflective polarizing material 40 is configured to be incorporated in apparel, it will be appreciated that it can be incorporated in props carried by performers, stationary props, and other surfaces, as discussed above. Clothing sold or given to members of an audience, such as T-shirts, may incorporate the material and the effect can be practiced interactively with audience members. As will be appreciated, numerous applications in entertainment, advertising, and performance art, for example, are possible.

Figure 5:
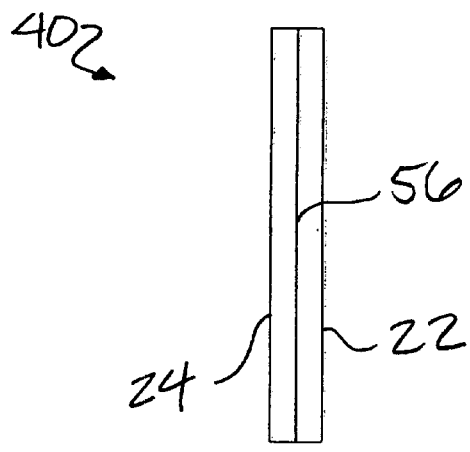
FIG. 5 is a schematic diagram of a reflective polarizer material in accordance with principles of the invention.

With reference to FIG. 5, the wearable reflective polarizing material 40 will be considered in more detail. Shown is a cross section of a layered construction of the reflective polarizer used to fabricate the wearable reflective polarizing material used in this system 10. As discussed in connection with the embodiments where the latent color and/or image(s) are resolved at the surface of the reflective polarizing material 40, the reflective polarizer generally comprises a polarizing analyzer 24 bonded to a polarization maintaining reflective material 22, which gives a polarization maintaining reflective surface 56 at the contact between the two materials.

There are also at least two kinds of commercially reflective polarizing material 38 suitable for this application. The first is a reflective polarizing material in which the entire surface of the material has the same polarization angle. Materials of this type generally come in 17 inch by 30-inch sheets. In some instances you can get the polarization materials on rolls. The most suitable material found to date for this application is IP40NGUV-NDIO from International Polarizer, Inc. of Marlborough, Mass. The second is a transmissive polarization material comprising an analyzer 24 in which the surface of the sheet is composed of two or more discrete areas with mutually different polarization angles. Materials of this type generally come in 18 inch by 24-inch sheets. In materials of this type, the discrete polarization areas are typically specific shapes, such as concentric rings, pie shapes that make up complete wheel like structures, and more amorphous shapes. This material can be combined with a polarization maintaining material 22 in a laminated configuration to provide a reflective polarizing material. The most suitable materials of this second type found to date for this application are manufactured by Frank Woolley & Co, of Reading Pa.

There are at least 4 ways of making reflective polarizing materials 38 that incorporate multiple polarization angles in a single sheet. These methods include physical fabrication of the materials having a configuration as shown, as well as making other configurations by: a printing process; a "silk screening"-like process; and by the use of a die as explained below.

With regard to printing, the technology is known, and involves the printing of discrete areas, each having different polarization angles, onto an appropriate substrate using polarized ink. The substrate can comprise polarization maintaining reflective material 22 and the ink an analyzer 24. Alternatively, both reflecting and analyzer functions can be performed by layers of ink printed on the substrate. Alternatively, parallel lines of polarization maintaining reflective material can be printed over a non-reflective substrate, giving rise to an analyzer functionality in the direction parallel to the printed lines.

Some reflective polarizing materials 38 are made using a technology similar to silk screening. In this technology, a porous material is laid down over a substrate material. The porous material is porous because it is cut or in some way perforated in a specific pattern. Polarizing materials are then applied onto the porous material. Once the polarizing materials are applied, the porous material is lifted away; leaving the polarizing materials in a pattern that duplicates the pattern cut into the porous material. In this way, the reflective polarizing materials are laid down with specific polarization directions as defined by the cut patterns in the porous material. This can be done for example by thus pattern-placing a reflective polarization maintaining material on a non-reflective substrate.

Reflective polarizing materials 38 can also be fabricated using a "die emplacement" process. In this process, a polarizing material is applied to the surface of a substrate. This layer of polarization material is then mechanically stressed by the application of the die onto the material with considerable force. The die is grooved such that the polarization material flows into the grooves on the die. The grooves on the die are cut in such a fashion as to parallel the final polarization direction desired. The die is then removed, leaving behind linear concentrations of polarizer material aligned in the direction of the grooves.

Figure 6:
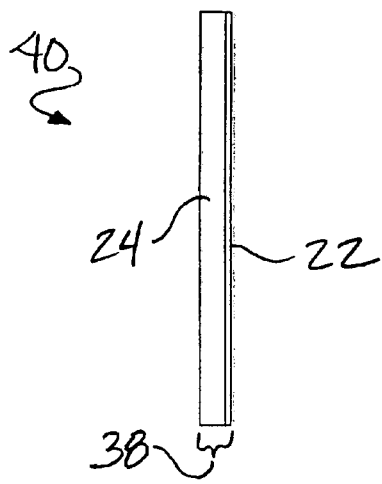
FIG. 6 is a schematic diagram of a reflective polarizer material in another embodiment.

With reference to FIG. 6, in an alternate embodiment of the wearable reflective polarizing material 40 a hand-made reflective polarizer 38 comprises a piece of polarization material comprising the analyzer 24 coated on one side with a polarization maintaining paint or other material 22. This paint can be applied by spraying, with a brush, or with a roller. Any polarization maintaining paint can be used. In general, any paint composed of, or containing metallic particles can be used, including copper, silver, gold and brass. The best polarization paints found to date are: Krylon 1701 (Bright Gold), Krylon 2203 (Bright Copper) manufactured by the Krylon division of Sherwin-Williams Company of Cleveland, Ohio, and Plasti-kote 1105 (Gold Leaf) and Plasti-kote 1395 (Brass) manufactured by the Plasti-Kote company. More information can be found at www.plasti-kote.com, and by E-mail to plasticote@plasti-kote.com.

Figure 7:
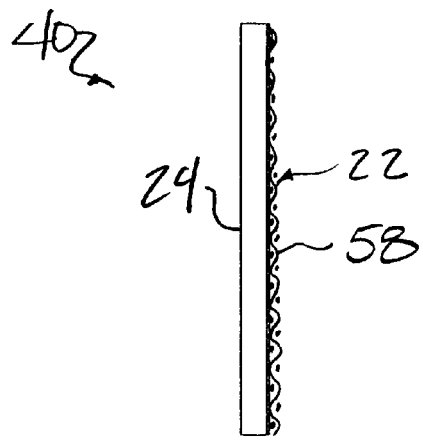
FIG. 7 is a schematic diagram of a wearable reflective polarizer material in another embodiment.

Turning to FIG. 7, in an alternate embodiment a wearable reflective polarizing material 40 comprises a piece of polarization material comprising the analyzer 24 coupled with a polarization maintaining fabric 58. This fabric can be intrinsically polarization maintaining, such as varieties of silvered Tyvek commercially available from Metallized Products Inc. of Winchester Mass., or the fabric can be made polarization maintaining by the application of polarization maintaining paints or inks. These paints can be applied by spraying, with a brush, or with a roller. Examples of polarization maintaining paint are given above. Pieces of polarization maintaining fabric may then be taped, glued, stapled, pinned, sewn, or riveted onto the polarizer. One practical way this can be done is to coat the fabric with the polarization maintaining paint, and then attach multiple sections of polarizer material comprising the analyzer 24 to the fabric. The fabric can be part an article of apparel previously made.

Figure 8:
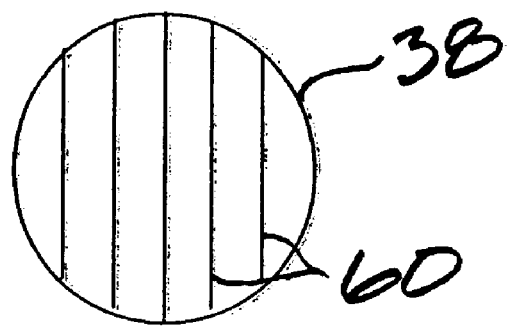
FIG. 8 is a schematic diagram of a wearable reflective polarizer material piece in accordance with principles of the invention.

With reference to FIG. 8, a representation of a reflective polarizer 38 includes lines 60 representing an orientation of privileged planes of polarization. A reflective polarizer material, such as International Polarizer IP40NGUV-NDIO when properly cut to shape, can be made into clothing. One manufacturing technique is to use a standard clothing pattern and to cut out the reflective polarizer in the forms of the patterns. These pieces can then be sewn together into a wearable reflective polarizing material using a sewing machine or by hand. Such clothing is quite stiff, however, as the material bends much less than fabric materials.

Another technique involves laminating pieces of the reflective polarizer 38 onto a suitable cloth material. The reflective polarizer may be taped, glued, stapled, pinned, sewn, or riveted onto the cloth. This laminated wearable reflective polarizing material can then be cut using standard clothing patterns. These pieces can then be sewn together using a sewing machine or by hand.

Figure 9:
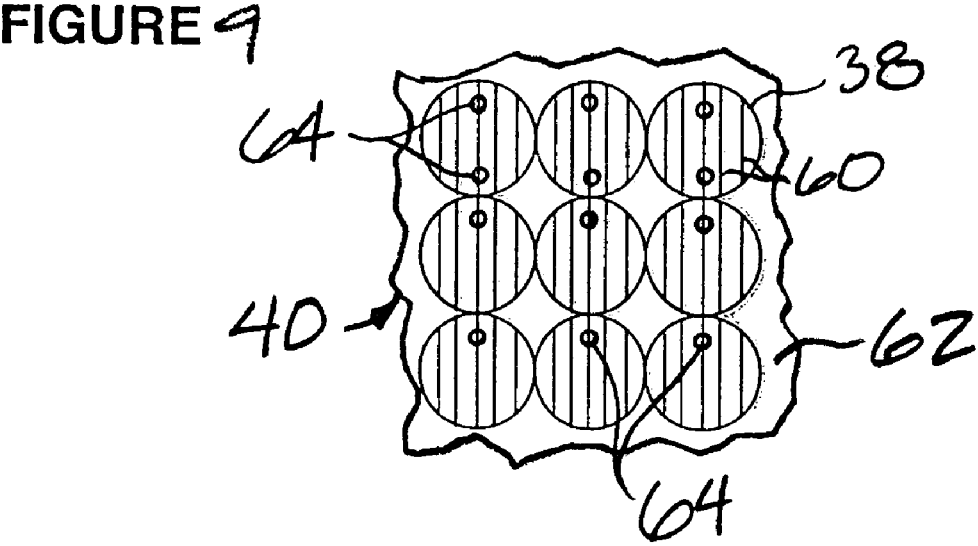
FIG. 9 is a schematic diagram of an arrangement of units of wearable reflective polarizer material.

FIG. 9 is a representation of a coherent reflective polarizing material 40 comprised of a number of smaller reflective polarizer 38 pieces combined together into a coherent wearable reflective polarizing material. In this embodiment of the invention, all of the individual reflective polarizers have identical polarization orientations represented by lines 60 in the figure. The shape of the individual smaller reflective polarizers can be any shape desired, including circles, squares or triangles. In the same context, these smaller reflective polarizers can be any size desired which can be made and attached to an underlying support matrix 62 such as the fabric of apparel. The spacing between each of the individual reflective polarizers can be any size desired, but resolution of resolved images degrades with increased spacing. The reflective polarizers and the wearable reflective polarizing materials 40 comprising the reflective polarizers and underlying matrix can be cut into pattern shapes using a knife, a paper cutter, a laser cutting system, or other mechanical cutting system. Circular shapes are shown, but as a practical matter some indicia of the orientation of polarization planes must be shown. This can be done by tracing lines 60 on the material prior to cutting the shapes, or by incorporating notches (not shown) or holes 64 or shape characteristics such as being longer in one direction, corresponding to the orientation of the privileged direction for example. The individual reflective polarizers can be attached as described above, and further can be printed, silk screened or die emplaced into a suitable material. The overall coherent wearable reflective polarizing material can be cut into any shape desired.

Another manufacturing technique for this kind of coherent wearable reflective polarizing material 40 is to sew the individual reflective polarizers onto a piece of already manufactured clothing. In this method, the individual reflective polarizers may have mounting holes 64 already fabricated in them. One hole adjacent a top of the polarizer, or two holes aligned with the privileged direction are examples as shown. These mounting holes may be oriented such that the pieces have a readily apparent indicator of their polarization direction as mentioned. These pieces of reflective polarizer may then be also or alternatively taped, glued, stapled, pinned, or riveted onto the fabric of the existing piece of clothing in this case comprising the matrix 62.

An alternative is to manufacture cloth incorporating the reflective polarizers 38 which can then be cut and formed into clothing as mentioned above. Like the preceding manufacturing method, the individual reflecting polarizers may have mounting holes 64 already fabricated in them positioned or relatively oriented such that the pieces have a readily apparent indicator of their polarization orientations. Again, the pieces of reflective polarizer 38 may be taped, glued, stapled, pinned, sewn or riveted onto the cloth. A standard clothing pattern may then be used to cut the cloth in the desired shapes from the pattern. These pieces can then be sewn together, into a coherent wearable reflecting polarizing material, using a sewing machine or by hand.

Figure 10:
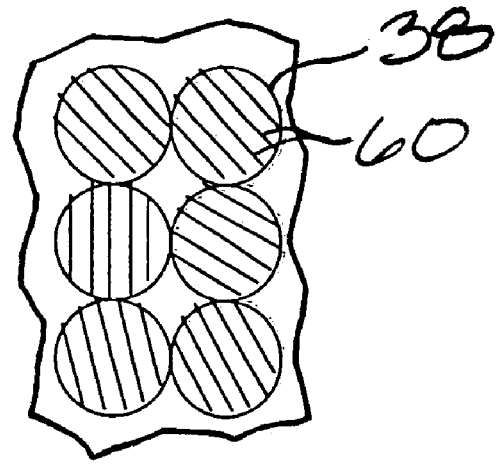
FIG. 10 is a schematic diagram of an arrangement of units of wearable reflective polarize material in another embodiment.

With reference to FIG. 10, in an alternate embodiment, a non-coherent wearable reflective polarizing material 40 is comprised of a number of smaller reflective polarizer 38 pieces combined together. In this embodiment the individual smaller reflective polarizers have different relative polarization angles arranged randomly as shown by illustrative lines of orientation 60. With random orientation indicia of the privileged direction is not actually required and attachment by adhesives and other methods can be speeded as the direction of polarization orientation does not need to be tracked. Otherwise the wearable reflective polarizing material is configurable and manufacturable as described above.

Figure 11:
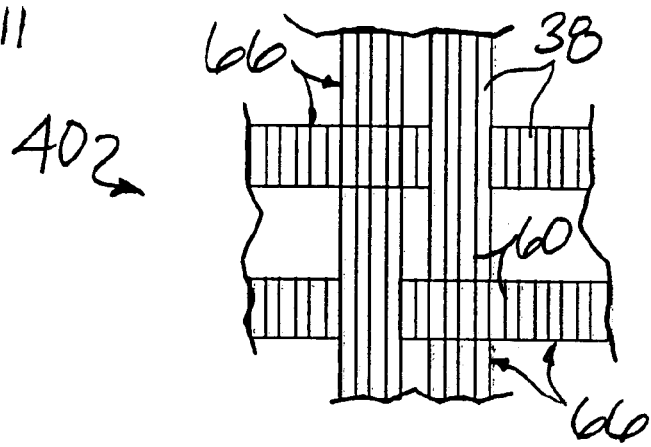
FIG. 11 is a schematic diagram of a woven wearable reflective polarizer material in accordance with principles of the invention.

Turning now to FIG. 11, a reflective polarizer 38 constructed as in one of the embodiments described above is formed into strips 66. The strips are then woven together to form a wearable reflective polarizing material 40. This textile-like approach mitigates the relatively stiff nature of some reflective polarizer materials. In the illustrated embodiment, the Polarization angles between the reflective polarizer strips composing the warp and the woof of the "fabric" created are 0 degrees, and the illustrative lines of orientation 60 shown are aligned so as to be parallel to one another as would be the privileged planes of the polarizers. The strips comprising individual "fibers" of reflective polarizer can be any width both desired and practicable given the materials used. The reflective polarizer can be cut into strips using a knife, a paper cutter, a laser cutting system, or other cutting system. Alternatively the individual reflective polarizer fibers could be manufactured originally as strips, so they do not need to be cut from a larger sheet. Also, the overall look of the woven material could be printed, "silk screened" or die emplaced onto a suitable substrate.

Using the wearable reflective polarizing material 40 formed in this way apparel can be made in several ways. One technique is to form a woven reflective polarizing material and then use a standard clothing pattern and cut out shapes from the "fabric" formed by the woven reflective polarizing materials 38 in the forms of the patterns. These pieces can then be sewn together to form a garment formed of wearable woven reflective polarizing material, using a sewing machine or sewing by hand. Another way this can be done is to affix sections of this woven reflective polarizing materials 38 onto a piece of previously manufactured clothing. The woven materials may be taped, glued, stapled, pinned, sewn, or riveted or attached in another way onto the existing piece of clothing. An alternate way of doing this to manufacture woven reflective polarizing materials 38 comprising a wearable reflective polarizing material 40 which can then be bonded onto a piece of appropriate cloth of conventional manufacture. The woven reflective polarizing materials can be attached to the cloth by one or more of the above-mentioned methods. A standard clothing pattern may then be used to cut the cloth/woven reflective polarizer laminate into pieces in the forms of the patterns. These pieces can then be sewn together into a wearable form using a sewing machine or by hand.

Figure 12:
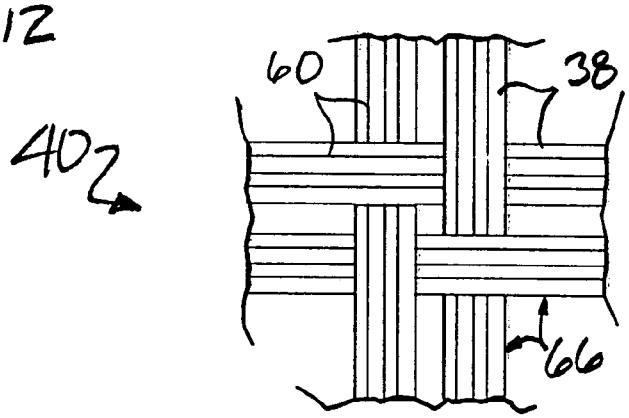
FIG. 12 is a schematic diagram of a woven wearable reflective polarizer material in another embodiment.

With reference to FIG. 12, in another embodiment the wearable reflective polarizing material 40 is made from strips 66 of reflective polarizer 38, as before described, but the relative polarization angles of the reflective polarizers composing the warp and the woof of the fabric are non- zero, and the privileged directions are non-parallel to each other. In the illustrated embodiment the relative angle between the warp and woof is 90 degrees. This is relatively simple as the strips all have polarization directions, as illustrated by the lines 60 parallel with the strip itself, and are woven orthogonally. However, by variation of the relative orientations of the woven strips with variation of the pattern of weaving many polarization angles can be obtained. Otherwise the material is the same in manufacture and use as that described above with reference to FIG. 11.

Figure 13:
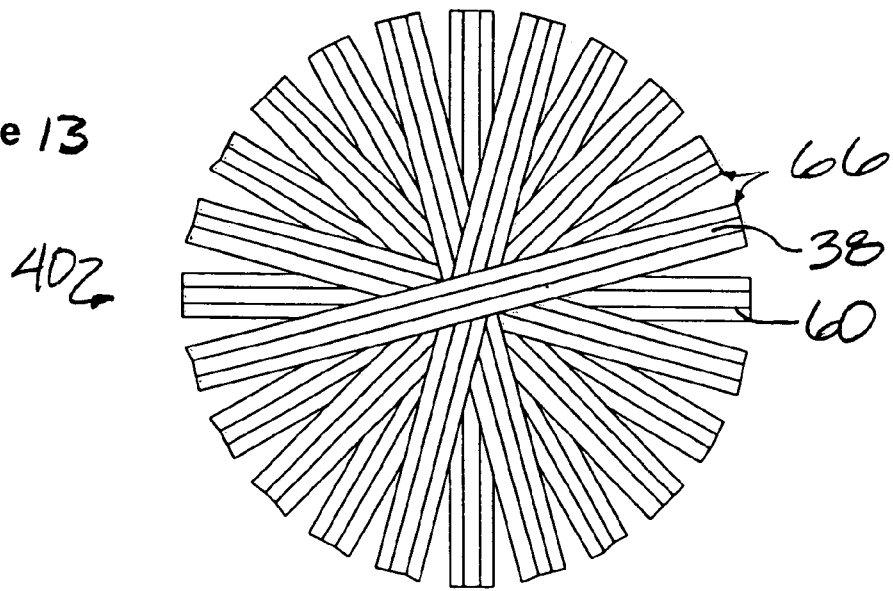
FIG. 13 is a schematic diagram of a woven wearable reflective polarizer material in another embodiment.

Turning to FIG. 13, in another embodiment a wearable reflective polarizing material 40 comprises a woven fabric made from strips 66 of reflective polarizer. This embodiment is constructed using the same methods used in constructing a straw hat or a woven basket. There are two kinds of reflective polarizer strips. The first kind of reflective polarizer strip 66 has a preferred polarization direction substantially parallel to the long axis of the strips as illustrated by lines 60. This kind of strip can be called the linear strip. The second kind of reflective polarizer strip is cut into a spiral. In weaving the material, the linear strips are placed one above the other at an arbitrary point, and the strips are arranged in the form of a spiral. As can be seen, the illustrative lines converge to a central portion where the strips overlap. The relative polarization angles of the reflective polarizers can range between 0 an 90 degrees, and in the illustrated embodiment range from about 15 degrees to 90 degrees in 15 degree increments. The spiral strip is then inter-woven through the linear strips. Starting at an arbitrary zero angle position linear strip, the spiral strip is woven over the top surface of the first linear strip, under the bottom surface of the second linear strip, over the top surface of the third linear strip, etc. The spiral strip is in this fashion woven completely through the area of the linear strips. If desired, when the spiral weaving reaches radially outward to the point that additional linear strips can be added between the overlapping strips, this can be done to continue the weaving pattern radially outward as is done in weaving a basket bottom. As the weaving continues radially outward additional linear strips can be added as needed. The final woven material in this embodiment is non-coherent, in that the strips have unique polarization directions. The individual strips can be any width desired and practical with the material used.

Like the previous embodiments, a wearable woven reflective polarizing material 40 can be used to form apparel using a standard clothing pattern and cutting out the woven reflective polarization materials in the shapes of the patterns and sewing these together. Alternatively, the woven reflective polarization materials are attached to a piece of clothing already made. An alternate embodiment, the woven reflective polarization materials are attached onto a piece of cloth, and a standard clothing pattern may then be used to cut the cloth and then sew pieces together to form apparel.

Figure 14:
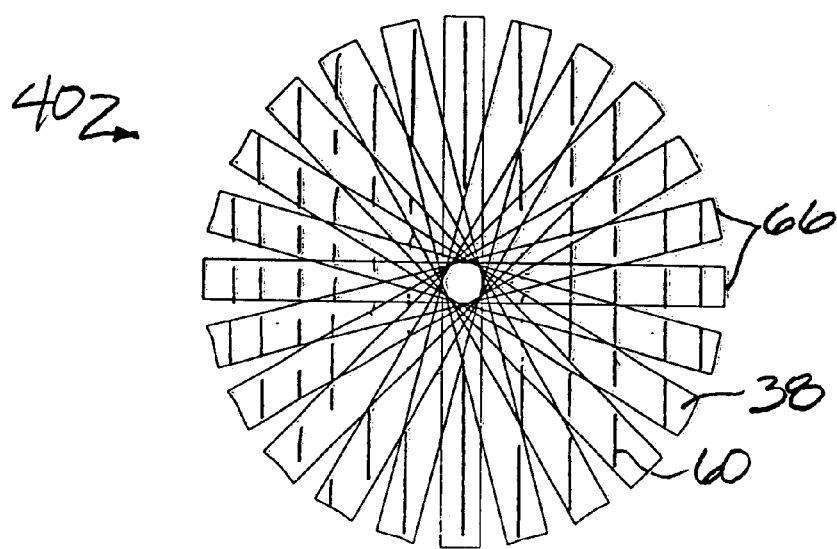
FIG. 14 is a schematic diagram of a woven wearable reflective polarizer material in another embodiment.

FIG. 14 is another example of a woven wearable reflective polarizing material 40. It is also constructed using the same methods you would use in constructing a straw hat or a woven basket. In this embodiment, there are two kinds of reflective polarizer strips. The first kind of reflective polarizer strip 66 has a preferred polarization direction that is determined prior to fabrication. In this embodiment, the number of radial linear strips in the application is calculated before hand and this number is divided into 360 degrees. This determines the angular difference between each of the individual polarization strips. These individual polarization strips are then precut along the desired polarization directions using an appropriate cutting system. The second kind of reflective polarizer strip is cut into a spiral. In weaving the material, the linear strips are placed one above the other at an arbitrary point, and the strips are arranged in the form of a spiral. As can be seen, the strips converge to a central portion where the strips overlap. The relative angles of a longitudinal axis of the reflective polarizer strips to the polarization angle of the material can range between 0 an 180 degrees, and in the illustrated embodiment ranges from about 0 degrees to 180 degrees in 15 degree increments. When forming the strips into the weave, care must be taken to insure that the final fabric has a coherent polarization direction, to wit, that all of the individual fibers end up with parallel or sub-parallel polarization directions. The best way to insure this is for the weaver to wear polarized glasses such that the weaver can see changes in polarization direction. The basic idea is to make sure that all of the strips viewed through the polarized glasses have the same black, white or gray scale values. The best approach is to tune to the blackest values, since they are the easiest to see. The spiral strip is then inter-woven through the linear strips. Starting at an arbitrary 0 position linear strip, the spiral strip is woven over the top surface of the first linear strip, under the bottom surface of the second linear strip, over the top surface of the third linear strip, etc. The spiral strip is in this fashion woven completely through the area of the linear strips. Care must be taken to insure that this spiral strip ends up with a polarization direction that is substantially parallel to the polarization angles of the individual linear strips. The final woven material in this embodiment is coherent, in that all of the strips have substantially parallel polarization directions. The individual strips can be any width desired and practical with the material used.

Figure 15:
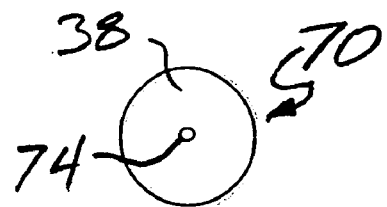
FIG. 15 is a representation of a sequin configuration for a wearable reflective polarizer material in accordance with principles of the invention.
Figure 16:
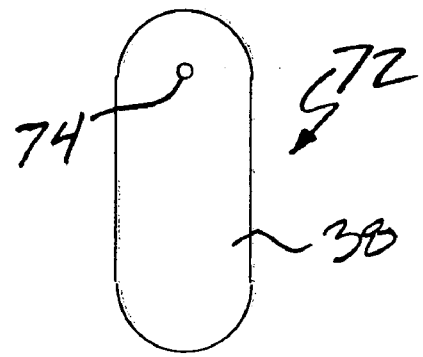
FIG. 16 is a representation of a sequin configuration for a wearable reflective polarizer material in another embodiment.
Figure 17:
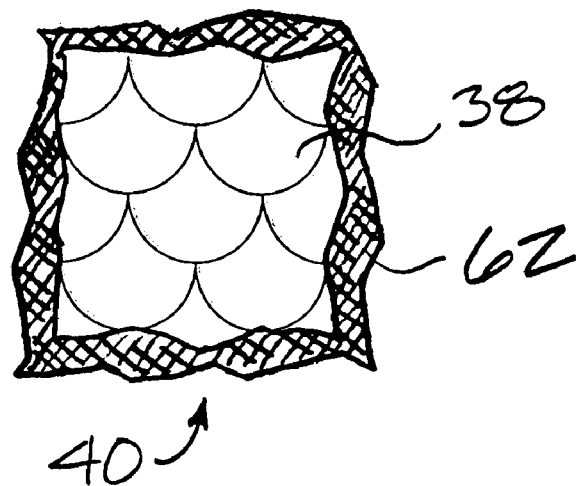
FIG. 17 is a representation of a sequin pattern configuration for a wearable reflective polarizer material in accordance with principles of the invention.

In another embodiment of the invention the wearable reflective polarizing material 40 can comprise sequins 70. An example of a circular sequin made from a reflective polarizer 38 is shown in FIG. 15. Sequins are well suited for incorporation of reflective polarizers in apparel, due to the inherent stiffness of some reflective polarizer constructions. The orientation of the polarizing planes of the reflective polarizer material comprising the sequin with respect to other sequins can be zero (parallel) or any relative polarization angle desired, as discussed above in connection with FIGS. 8–10. The sequin can be any size or shape desired. This includes elongated sequins 72 such as that illustrated in FIG. 16. Circular or elongated sequins can be arranged in patterns on an underlying matrix 62, such as fish scales as shown in FIG. 17, among others. The underlying matrix will usually be cloth of apparel worn by a performer. The sequin can be made with or without a mounting hole 74. The reflective polarizer sequins can be cut out using conventional methods such as by hand using a knife, a paper cutter, a laser cutting system, a stamping process, or other mechanical cutting system. The equivalent of individual reflective polarizer sequins could also be printed, "silk screened" or die emplaced into a polarized surface as discussed above.

In manufacturing a wearable reflecting polarizing material 40, one technique is to affix these sequins onto a matrix 62 comprising a piece of ready made clothing. These sequins may be taped, glued, stapled, pinned, sewn, or riveted onto the existing piece of clothing. An alternate embodiment is to manufacture sequined cloth which can then be formed into clothing. In this method, the sequins are attached as before described onto a piece of cloth. The sequined cloth is then cut in accordance with a clothing pattern, and sewn as before described, to form apparel. In another embodiment the underlying matrix can comprise cloth tape with adhesive on one side. Fish scale type sequins are laid edge-to-edge and affixed to the sticky side of the tape fabric. This material can be used for trim and like applications.

Figure 18:
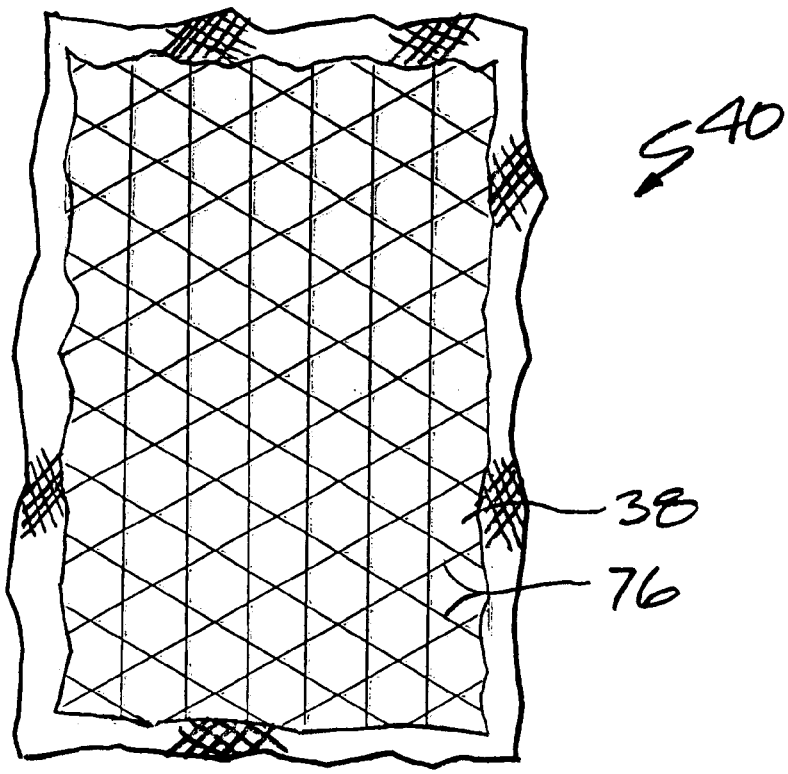
FIG. 18 is a representation of a scoring pattern configuration for a wearable reflective polarizer material in accordance with principles of the invention.
Figure 19:
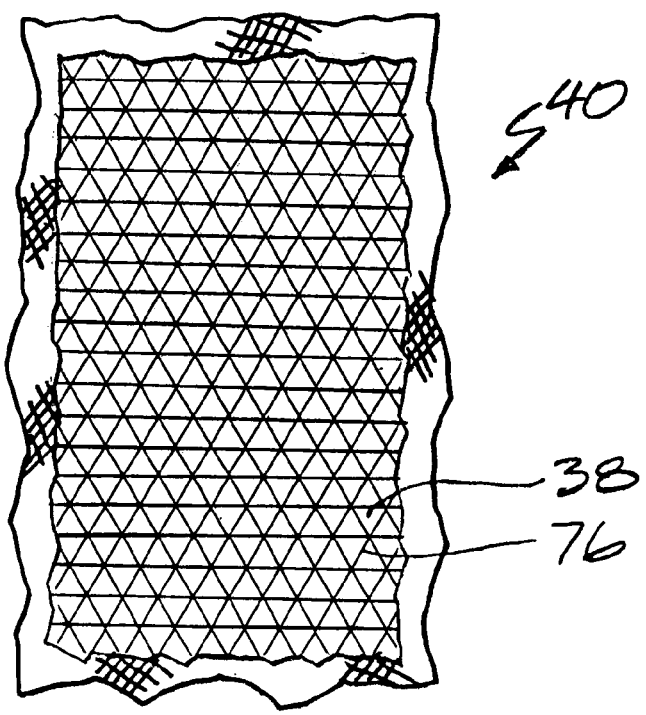
FIG. 19 is a representation of a scoring pattern configuration for a wearable reflective polarizer material in another embodiment.

With reference to FIG. 18 in another embodiment wearable reflective polarizing material 40 comprises a scored material made from a sheet of reflective polarizer 38 laminated to an underlying fabric support matrix 62 using an adhesive. Once laminated, the reflective polarizer is cut through along score lines 76 but the underlying fabric material is left intact. The structure thereby comprises small individual separated pieces of the reflective polarizer, free to move with respect to each other, but connected to each other by the underlying matrix. Different scoring patterns can be used. In this embodiment the scoring pattern imposed on the reflective polarizer 38 generates individual pieces of reflective polarizer shaped as hexagons and triangles. In another embodiment, illustrated by FIG. 19 the pattern of score lines 76 generates triangles. As will be appreciated other combinations of reflective polarizer shapes can be used, in various sizes, depending on the application. The polarized shapes can be cut into the reflective polarizer using a knife, a rotary saw blade, a laser cutting system, or other cutting system.

Articles of clothing can be formed of wearable reflective polarizing materials 40 which are scored in this way using a standard clothing pattern, and cutting out the scored material in the forms of the patterns. These pieces of scored material can then be sewn together. An alternative is to affix this scored material onto a piece of already manufactured clothing. As with similar methods described above, attachment can be by taping, gluing, stapling, pinning, sewing, riveting, or other means.

Figure 20:
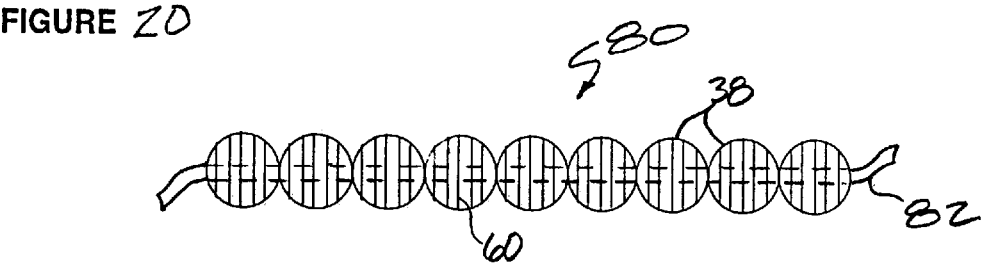
FIG. 20 is a schematic diagram illustrating a placement and orientation scheme for wearable reflective polarizer material sequins formed into a braid, each having a plane of polarization parallel to adjacent sequins.
Figure 21:
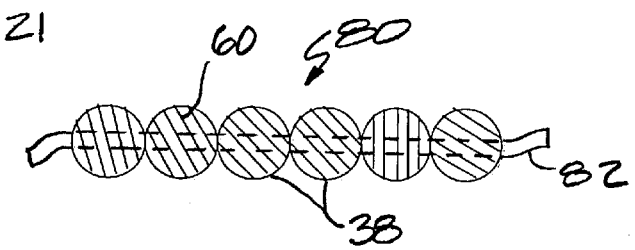
FIG. 21 is a schematic diagram illustrating a placement and orientation scheme for such sequins formed into braid in another embodiment, each having a plane of polarization in random directional orientation to adjacent sequins.

With reference to FIGS. 20 and 21, apparel decoration can also be made and used with the system 10, for example having the trim of the performers costume change color. As an example, a representation of reflective polarizer braid 80 is illustrative. Pieces of reflective polarizer 38 are connected together by attachment to a tape 82 or other continuous carrier such as string, or are sewn, woven or braided together to form long strips of braid. The braid is then attached to apparel by sewing or in one of the many other known ways such as those mentioned above. The pieces can have parallel polarization angles, such as illustrated by lines 60 in FIG. 20, or non-parallel polarization angles such as illustrated in FIG. 21. In the former, the same color is seen along the strip of braid 80. In the later, each piece can be a different color, giving a multi-colored effect.

Figure 22:
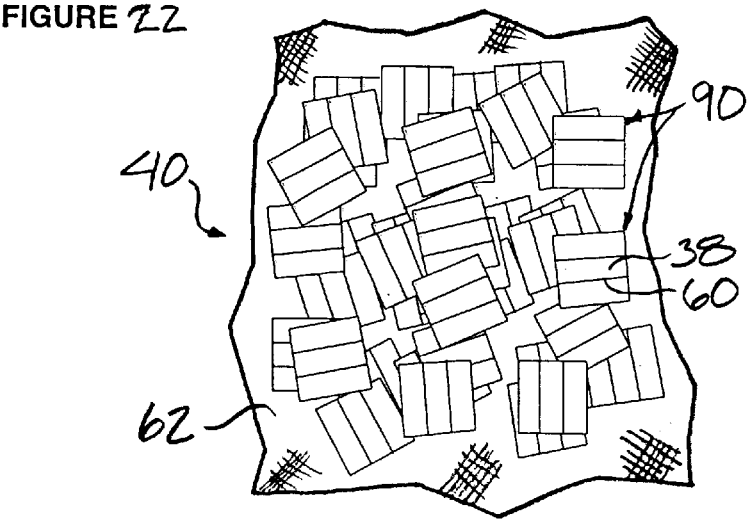
FIG. 22 is a schematic diagram illustrating wearable reflective polarizer material glitter in accordance with principles of the invention.

With reference to FIG. 22, another way to form a wearable reflective polarizing material 40 is to apply a glitter 90 comprising pieces of reflective polarizer 38 to apparel items already made, or to a support matrix 62 such as a fabric. The individual grains of the glitter can be any size or shape desirable and practicable with the materials used. The glitter can be made by chopping up sheets of reflective polarizer into small pieces using a knife, a paper cutter, a laser cutting system, or other cutting system or stamping process. The reflective polarizer 38 could alternatively be printed, "silk-screened" or die emplaced into a suitable substrate. The glitter can be attached to the clothing or other support matrix by applying adhesive where glitter is to be attached and then applying glitter. The areas of application can be patterned or comprise a design by selective application of adhesive in areas where glitter is to be attached, and not elsewhere, to form pattern or design. In one embodiment the glitter can be applied using a special 'flocking type gun' employing a stream of moving air to deposit glitter particles.

Figure 23:
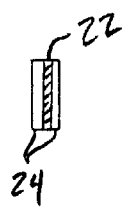
FIG. 23 is a schematic representation of a configuration of wearable reflective polarizer material glitter.

Referring to FIG. 23, the glitter 90 in one embodiment can advantageously be made by first laminating sheets of reflective polarizer 38 so that an analyzer 24 comprises the front and back, with polarization maintaining material 22 sandwiched between and backing each analyzer, then cutting the laminate to form glitter pieces. This gives glitter pieces which are reversible.

Figure 24:
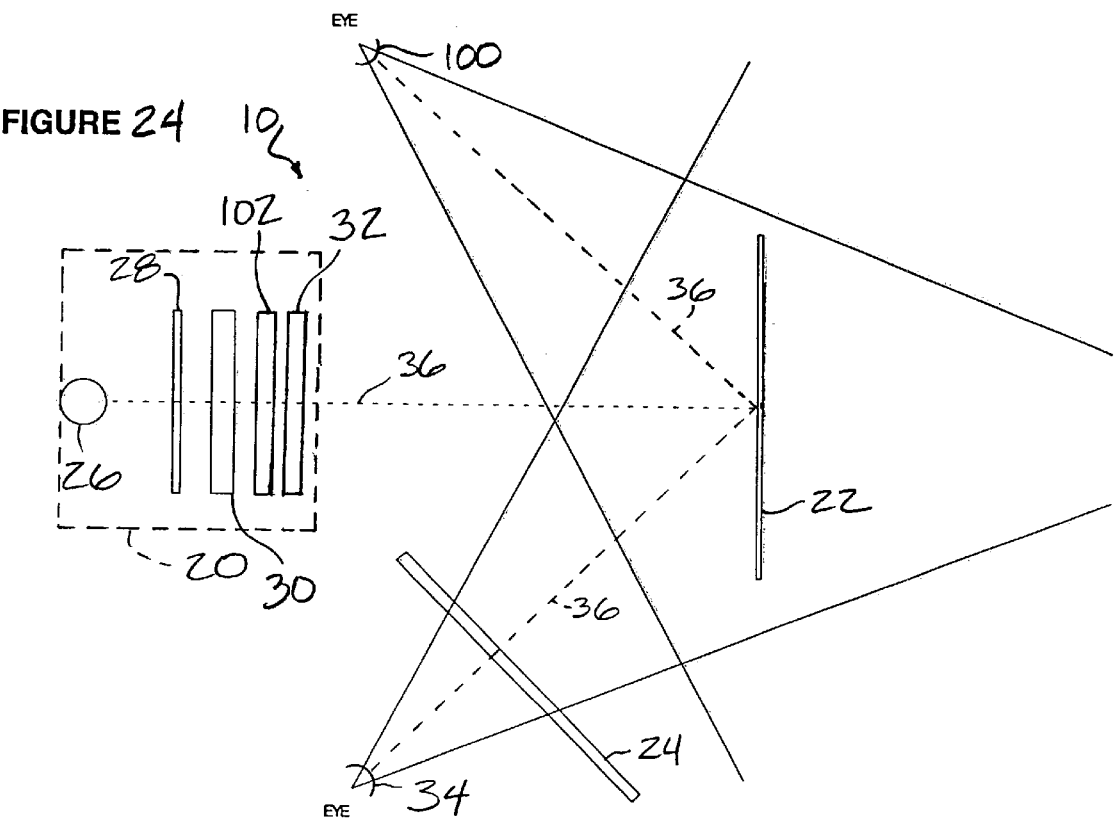
FIG. 24 is a schematic diagram of a visual effect system in accordance with principles of the invention.

Turning now to FIG. 24, the system 10 and its operation has been described, and certain additional examples of effects obtainable will now be discussed. When light rays comprising a latent color, as described in detail above, are projected along a light path 36 onto a wearable polarization maintaining material 22, they are reflected and scattered back towards the eye of a first viewer 34 and a second viewer 100. In this effect, the wearable polarization maintaining materials comprise apparel items coated with a polarization maintaining paint or high solids ink containing metallic particles, which supplies a base color to the wearable material. When viewed in normal (unresolved) light by the second viewer 100, this base coating imparts a uniform color to the wearable materials. When an analyzer 24 comprising a screen or polarized glasses is interposed with the light path, the polarization encoded latent color projected onto the surface of the wearable polarization maintaining material can be resolved as a color, as previously described. This is done when the wearable polarization maintaining material is viewed by a viewer 34 observing the wearable polarization maintaining material though the analyzer comprising a screen or glasses worn by the viewer. Such glasses comprising an analyzer are well known and widely used at theme park attractions and theaters using or exhibiting "3-D" motion pictures, for example. While the planes of polarization are different for the right eye and the left eye in such glasses, they are the same, i.e. parallel in this embodiment of the system 10. In this effect, the color will only be resolved on the surface of the polarization maintaining material, and it will not be resolved on the surfaces of the actor's hands or face. Any surfaces surrounding the actor will also not resolve the color. This effect allows the remote changing of the color of a complete costume using projected light. The entire costume changes the same color at the same time. By inserting a patterning element 102 comprising a patterned mask or patterned birefringent material in the light path in the projector 20 patterns of color can be projected onto the apparel of the performer and any prop surfaces covered by a polarization maintaining material 30.

With reference to FIG. 25, effects can be obtained when latent color is projected onto a coherent (all the planes of polarization are essentially parallel) wearable reflective polarizing material 40. In this effect, latent color from the projector 20 is resolved at the surface of the coherent wearable reflective polarizing material. In one effect, a single color will be resolved over the entire surface of the coherent wearable reflective polarizing material. This effect allows the remote changing of the color of a complete costume using projected light. The entire costume changes the same color at the same time. The color will not be resolved on the surfaces of the actor's hands or face. Any surfaces surrounding the actor will also not resolve the color. This effect can be achieved through the use of 'off the shelf' coherent reflective polarizers, hand made painted reflective polarizers, and with woven, coherent reflective polarizing materials. Sequins, fishscales, and scored materials as described above can be used, disposed so that the orientations of the planes of polarization are essentially parallel. Here again a colored pattern can be projected using a patterned element 102 as described above.

FIG. 26 illustrates the effect that occurs when latent color is projected onto a non-coherent wearable reflective polarizing material 40. In this effect, the latent color from the projector 20 is resolved at the surface of the non-coherent wearable reflective polarizing material. The clothing of the performer comprises many smaller pieces 104, 106, 108 of reflective polarizer 38, with different polarization angles, each smaller piece of reflective polarizer resolves a different color. In this context, the effect allows the remote changing of the color of areas of a costume using projected light. Different parts of the costume change different colors at the same time. In this effect, the color will be resolved on the surfaces of the pieces making up the non-coherent wearable reflective polarizing material, but not elsewhere. This type of effect can be achieved using sequins, fish scales, non-coherent woven materials, and glitter, among other embodiments.

Figure 27:
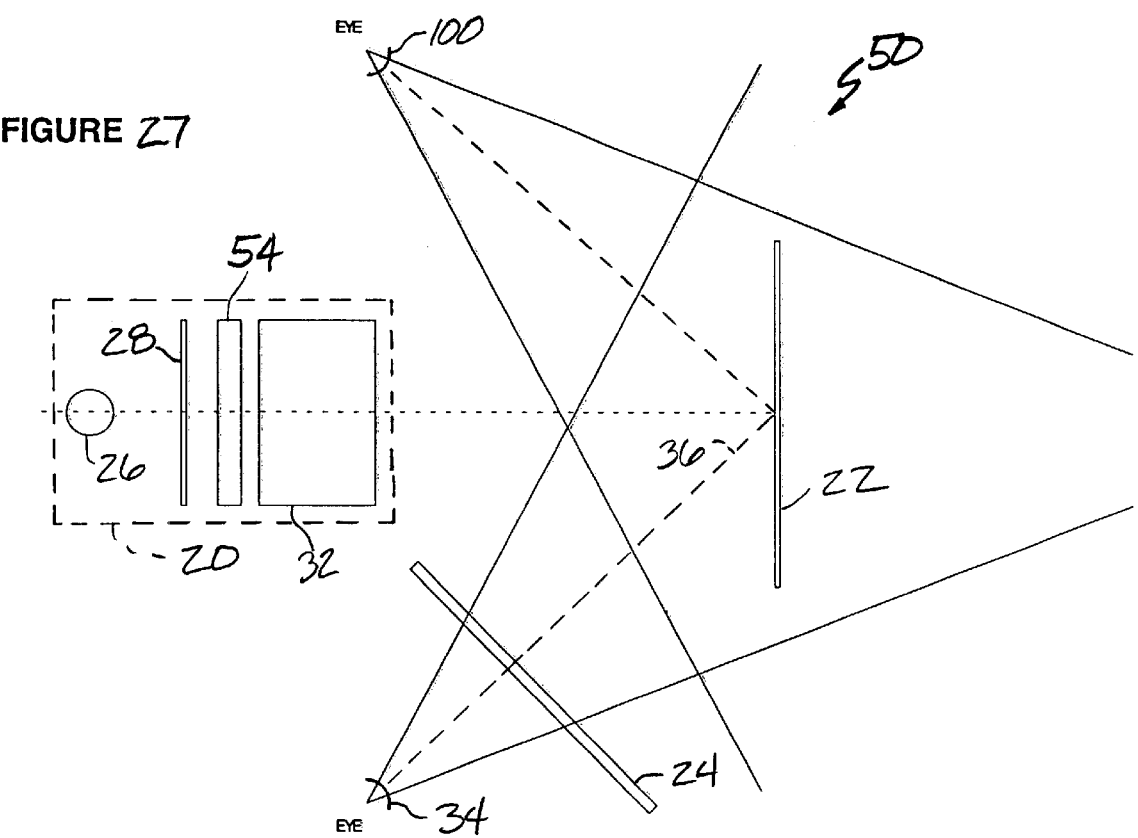
FIG. 27 is a schematic diagram of a visual effect system in another embodiment.

With reference to FIG. 27 in a latent video projection system 50 an effect occurs when a latent video image is projected onto a wearable polarization maintaining material 22. In this effect, the performer's apparel is coated with a polarization maintaining paint or ink as described above, which again supplies a base color to the wearable material. When viewed in normal (unresolved) light by a second viewer 100, this base coating imparts a uniform color to the wearable materials. The latent video image is perceived on the performer's apparel, but not on the performers face or other surfaces not comprising the polarization maintaining reflective material 22, by a first viewer 34 due to interposition of the analyzer 24. Again, the analyzer can take the form of a screen of polarizing material or polarizing glasses worn by the viewer. The screen can be positioned on stage for example and moved around so that different segments of the audience view one or more performers at different times. Alternatively the screen can be configured to look like a window through which viewers look.

This effect allows the remote changing of the complete imagery on a costume using projected video. The entire image on the costume changes at the same time. In another embodiment a latent video image comprising a single color is projected onto the surface of the wearable polarization maintaining material 22. The entire color of the costume changes at the same time. In another embodiment a patterned color or patterned black and white video image is projected rather than a single color. The color and/or pattern is changeable over the entire costume. In another embodiment only parts of the apparel of the performer are coated, and the image will change only on the coated parts.

In another embodiment, an image comprised of a two color anaglyph, (red/green is typical) is projected through a latent image projector 52 onto a polarization maintaining material 22. A viewer 34, when using the appropriate analyzer 24 would perceive a blurry two-color image on the surface of the polarization maintaining material 22. If the viewer 34 were to wear the appropriate two color lenses (one color for each eye), the viewer would perceive full 3-D video on the surface of the polarization maintaining material 22. The second viewer 100, would merely see the white light from the system. The analyzer can be located on glasses or as a window that the viewer looks though.

In another embodiment a latent two color anaglyph (red green is typical) video is projected onto a polarization maintaining material with the red/green images being time sequential (120 frames/sec) rather than combined into a single video image. The image is resolved by using red/green glasses with mutually parallel polarizers over both of the lenses. The polarizer can be mounted on the surface of the glasses or at a distance from the viewer 34.

In another embodiment latent video images projected by two latent video projectors are projected onto a polarization maintaining surface such that the two images overlap. The image is resolved by using non-parallel polarizers covering each eye. Optimally, the two latent image projectors would have pre-polarizers at 90 degrees to each other. This system has an inherent difficulty in that a latent image projector as described projects all possible true and false color images separated by different planes of polarization. In this context, the left lens of the system could allow the viewer to see the true color image of the right view, and a false color image of the left view unless the ranges of colors are carefully selected to minimize this effect.

In a slightly different application, a latent 3-D effect can be accomplished where one of the right or left eye images is a latent, polarization encoded image, and the other complimentary right or left eye image is a polarized, non-latent image. In this embodiment, the non-latent image is typically polarized at 90 degrees to the preferred polarization direction of the latent polarization encoded image. Glasses comprising an analyzer 24 only over the eye to receive the polarization encoded image are worn by a viewer 34, which allows the eye to perceive the latent polarization encoded image, while blocking the polarized non-latent image. The complimentary eye is uncovered and views the polarized non-latent image, while being unable to perceive the latent polarization encoded image. In combination, the viewer 34 perceives a 3-D image. A second viewer 100 perceives only the polarized non-latent image, which is not in 3-D. Further, since half of the image is not latent, it will be perceptible on surfaces other than those comprising a polarization maintaining material 22 by both viewers. Nevertheless, the 3-D effect will be visible only on the clothing and other surfaces comprising polarization maintaining reflective material 22, and only to the viewer 34 viewing it through the analyzer 24.

Figure 28:
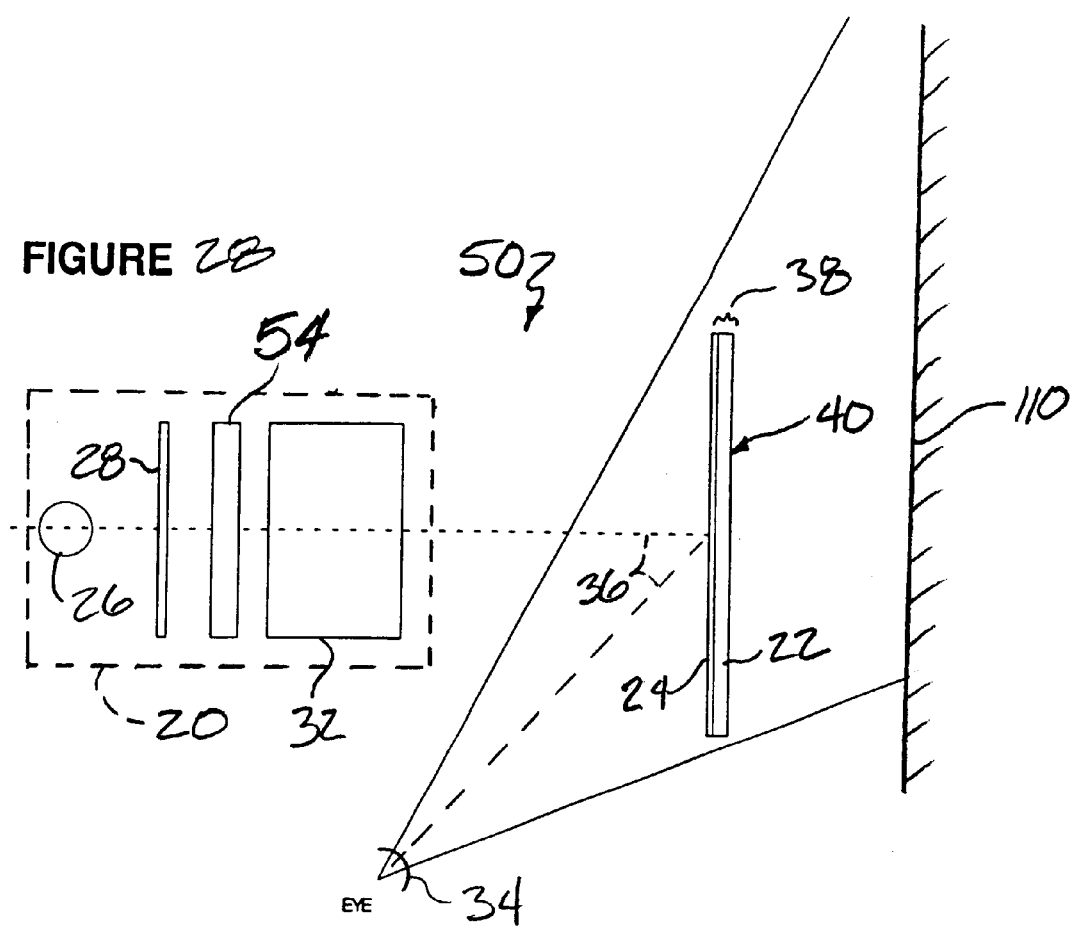
FIG. 28 is a schematic diagram of a visual effect system in another embodiment; and, FIG. 29 is a schematic diagram of a visual effect system in another embodiment.

FIG. 28 illustrates the effect that occurs when a latent video image is projected onto a coherent wearable reflective polarizing material 40. In this effect, the latent video image appears to the viewer 34 as video imagery, be it motion picture, recorded or live video, video still picture, patterns whether stationary or moving, solid colors, etc. in black and white or color, appearing at the surface of the coherent wearable reflective polarizing material. This effect allows the remote changing of the imagery on a complete costume using projected video. As before discussed the latent image will not be resolved on actor's hands or face or other surfaces not comprising reflective polarizers 38. As with systems discussed above, this effect can be achieved through the use of 'off the shelf' coherent reflective polarizers and hand-made reflective polarizers 38 in the various forms described above where the planes of polarization are essentially parallel.

In one embodiment of the system 10, the imagery projected on the costume is designed to match imagery applied or projected on a surface 110 behind the person in the costume, but not on the performer. In this effect, the fact that the wearable reflecting polarizing material 40 and the surface behind the material have the same image, causes the apparent distance between the two materials to vanish. The costume literally blends into the back wall as a form of "chameleon" effect. Only the performers face, hands, and other surfaces (if any) not covered by the reflecting polarizer 38 do not blend in. This effect can be achieved using any of the various forms of reflecting polarizers where the orientation of the planes of polarization are essentially parallel.

In another embodiment, latent two-color anaglyphic video (typically red/green) is projected onto a coherent reflective polarizer 38. To a viewer looking at the coherent reflective polarizer, the image can be perceived as a blurry two-color image. The 3-D aspect of the effect is resolved when the viewer looks at the surface with the appropriate two color glasses.

In another embodiment, latent two-color anaglyphic video (typically red/green) is projected onto a coherent reflective polarizer 38 with the red/green images being time sequential (120 frames) rather than combined into a single video image. The image is resolved on the surface of the reflective polarizer as a blurry two color image. The 3-D image is resolved by the use of the appropriate two color glasses.

Figure 29:
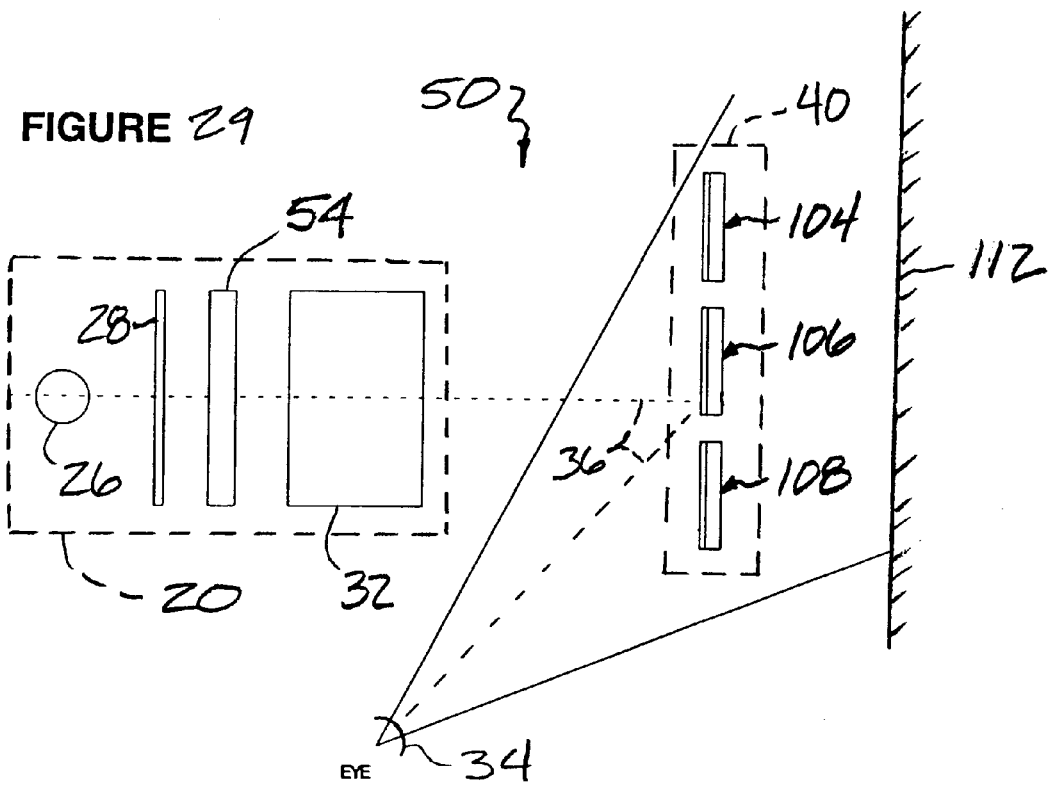

With reference to FIG. 29, another embodiment illustrates the effects that can be obtained when latent video imagery is projected onto a non-coherent wearable reflective polarizing material 40. In this effect, the latent imagery from the projector is resolved at the surface of non-coherent wearable reflective polarizing material. Because the clothing is composed of a very large number of smaller pieces 104, 106, 108 of reflective polarizer 38, as explained above each small piece of reflective polarizer resolves part of the image with a different false color. This effect essentially makes the wearable reflective polarizing material into a form of visual edge detector. The resolved image on the performers apparel is in false color, and appears as a series of oddly colored volumes or shapes. The result is visually interesting and outside ordinary experience for most viewers at present.

When the non-coherent reflective polarizing material 40 is applied to a wall 112 or as a hanging, the effect is similar to seeing shadow outlines on a wall. In another effect the video image can be a uniform color. This effect has the same visual impact as a latent color projection onto a non-coherent wearable reflective polarizing material.

Speaking generally of the invention, and with reference to FIGS. 27–29 specifically and all other figures generally, in application of inventive principles whether regarding projections of latent colors or images, it allows in live stage performances a fusion of dance and visual information in a novel way. It allows emotion to be conveyed through color and imagery of many kinds which is changeable over time. Storytelling aspects of performances can be enhanced using color and images, for example mermaid tails which look scalely, and change color to appear as if underwater at one time and out of water at another time can be created to enhance a performance wherein a mermaid character is featured.

Numerous other applications will be apparent to those skilled in the art, and while applications involving apparel are one important aspect of the invention, other applications including props and set pieces are another as mentioned. Also applications in other entertainment venues outside of theatrical productions are possible. Several additional illustrative examples will be set forth in general terms below.

A rock and roll band can use the latent polarization-encoded visual information effects for costuming effects, such as a randomly oriented, polarized sequined vest which can change color with variations in music performed. This system uses a latent color projector.

In an application comprising a fusion of video and dance, an actress/dancer performs while having live video projected onto a dress composed of a coherent reflective polarizer. One minute her clothing would be flowing water, the next minute it would be fire. This system uses a latent video projector.

Another variation of the foregoing would allow the viewer to "see" and experience what going on in the actors' mind by showing visual imagery on the chest of an actor covered with a reflective polarized material. This can be a projected video "dream sequence" for example. This system uses a latent video projector.

Another variant is "mood clothing," or clothing that would change color when the mood of the actor changes. This system uses a latent color projector.

As mentioned above, another embodiment is scales on a mermaid's tail. This is a variant on a randomly oriented, reflective polarized, sequined outfit, where the polarization angles of the sequins are oriented so that you get blues and greens as if the effect were under water. This system would use a latent color projector. The color can be made to shift to an "out of water" look, for example by moving a birefringent wedge in the light path to rotate the polarization angle of projected light, or shifting the tail to rotate the sequins. A variant of this system can be used to give robotic dragon and reptile skins a scaly appearance. This system also uses a latent color projector.

In another example, sequins which are made up of concentric rings of reflective polarizer material where the privileged planes of the various rings are oriented at different polarization angles, or round sequins that are composed of small pie shaped reflective polarizers having different polarization angles, have generated interest. These sequin portions having different polarization angles, when viewed under a latent color projector, give an impression of mechanical movement of the sequins, without need of actually allowing such movement. The appearance of pronounced shimmering sequin movement is obtained without the expensive fabrication and fragility of conventional reflective sequin costuming. This system uses a latent color projector.

In an educational venue, a mannequin with a polarization maintaining reflective surface is provided. One can project a latent anaglyph 3-D view of the inside of the human body on to it. If you then view the mannequin through the appropriate analyzer with color separation glasses, a 3-D view of the inside of the human body is perceived. This effect is very different from normal experience and is well adapted to capture the attention of students, museum patrons, etc. This system uses a latent video projector.

A theme park guest can be given a tee shirt with a coherent reflective polarizer laminated (or sewn) on the front surface. A latent video projector, positioned at an attraction, on a float, adjacent an attraction guest queuing area, etc. can deliver a video image onto the front of a guest. This would allow the guest to more directly interact with the attraction, or parade float, or entertainment while waiting in line. This system uses a latent video projector.

In another application, a piece of coherent reflective polarization material on the front of a dress or coat forms a screen suitable as a projection surface. If latent visual information such as text or a Logo is projected onto the screen, you would get video advertising. It is possible to animate a projected logo. As an example, imagine an animated logo on the tuxedo or dress of a notable individual at an awards show such as the Golden Globes. This system uses a latent video projector.

In a disco, this system can be implemented using a series of latent color projectors to flood a room full of people dancing. In this context clothing, the floor, and the walls can be made to "come to life" with a visual effect such as one of the examples disclosed herein. Objects and clothing items worn by employees and/or patrons are covered at least in part by a reflective polarizing material. This system would use a latent color and/or image projector.

A rock and roll band can have live video being projected onto coherently reflective polarizing material applied to band instruments. Imagine for example showing a bands' latest music video on stage on the drum set. On the other hand, a rock and roll band could have dynamically color changing set or stage floor pieces, composed of random or patterned reflective polarizing material pieces. In this context, the effect would allow for animation effects on a large scale. This system uses a latent color and/or video projector.

Another variant is an "invisible man" effect for live theater. In this effect, an actor off stage is filmed using a video camera and projected onto the back wall of the set covered in randomly oriented reflective polarizers, which are approximately ¼ of an inch long. The outline of the actor, reacting in real time, is visible to someone looking at the wall. This system uses a latent video projector.

Since an effect that is very magical and sparkly is possible, jewels in a treasure room could be made to change color in a very magical way. The jewels can be actually made as structural shapes composed of a reflective polarizing material. This system uses a latent color projector.

In another variant, reflective polarizing materials are used to fabricate a moving mechanism such as a clock. In this context, round sequins that are composed of pie shaped reflective polarizing materials having different polarization angles, viewed when illuminated by a latent color projector, give an impression of mechanical movement to the sequins as the polarization angle changes. This system uses a latent color projector.

In another embodiment, blinking lights and displays on sets for science fiction shows (such as the bridge of the Enterprise in Star Trek) can be replaced with coherent reflective polarizing materials. This system uses either a latent color projector or a latent video projector, or both.

In another application, an entire room could be coated with a reflective polarization material. If all of the material had the same polarization angle, by adjusting the polarization angle of latent polarization encoded color, it should be possible to change the entire color of a rooms' walls from a single light source. In this system, only the walls, covered by a reflective polarizing material would change color, and not any of the furniture or people in the room. This system uses a latent color projector.

Likewise, the color of the floor of a room can be altered. In this system, hexagonal pieces of reflective polarization material are pieced together to make a flooring "tile." The top and bottom of the floor "tile" are coated to protect the polarization material. If the pieces of polarization material are cut and laid at different polarization angles, you get flooring that is multi-colored and with change of the polarization angle changes color. This system uses a latent color projector.

Another embodiment entails taking some reflective polarization materials, cutting them into interesting shapes and sticking them on a wall. This "wallpaper" changes color as you look at it when projected latent information is changed. This system uses a latent color projector.

In another embodiment, reflective polarizing materials are incorporated in or draped over furniture, "video furniture" can be obtained. Three examples of video furniture are place mats, restaurant tables/booths, and air hockey surfaces. The place mats are woven such that both the weft and the woof have the same polarization direction. Video from a latent video projector will be resolved by this system. Video will not appear on the food, plates, etc. If you place a larger piece of reflective polarization material on a table surface, or around a restaurant booth you get a latent video tabletop and/or booth. Once again the video will not appear on the surface of the food, plates, etc. If you then place the material on the surface of an air hockey game, a video image can be made to appear on the surface of the game board, but not on the puck, players hands, etc. when doing projection from above the table. This system uses a latent video projector.

Other examples of implementation of the principles of the invention can be cited. As will be appreciated, the system for visual effects in accordance with the invention makes possible numerous visual effects in live stage performances, and may have further application in performance art and advertising applications, as well as numerous other entertainment applications. The system overcomes the disadvantages of the prior art discussed above, and enables creation of interesting and entertaining effects which have not been possible before. While many exemplary embodiments of the invention have been illustrated and described, it will also be appreciated that various modifications can be made with out departing from the spirit and scope of the invention. It is not intended that the invention be limited to the disclosed embodiments, and additional ways of implementing the invention will become apparent over time.

We claim:

1. In a system for visual effects involving apparel worn by a person, a method for projecting light including visual information onto a surface of the apparel so as to be observable by a viewer, comprising:

providing a polarized light projector;

providing a reflective polarization-maintaining surface carried by the apparel, providing another surface adjacent the reflective polarization-maintaining surface, projecting polarized light comprising latent visual information along a light path onto the reflective polarization-maintaining surface of apparel and then by reflection from said reflective polarization-maintaining surface of the apparel further along the light path to the viewer;

projecting polarized light comprising latent visual information onto another surface adjacent said reflective polarization-maintaining surface;

providing an analyzer in the light path which intercepts light traveling along the light path before the light reaches the viewer, the analyzer being positioned no earlier along the light path than substantially at said reflective polarization-maintaining surface of apparel worn by the person; whereby the visual information is resolved and made perceptible to the viewer as appearing at the reflective polarization-maintaining surface of the apparel, and whereby light comprising the visual information striking the other surface and reflected by the other surface is not resolved so as to be observable by the viewer as the visual effect.

2. The method of claim 1, further comprising the steps of:
providing the analyzer at the surface of the apparel; and
resolving the visual information to produce the visual effect at the surface of the apparel.

3. The method of claim 2, further comprising the steps of:
providing a wearable reflective polarizing material comprising an analyzer formed of a polarizing material and a polarization maintaining reflective material;
dividing the material into a plurality of small segments; and
attaching the small segments to the apparel so as to provide a surface of the apparel substantially comprising attached segments of wearable reflective polarizing material, whereby the surface of the apparel comprises a plurality of small segments individually having an analyzing polarization effect upon light comprising the polarized latent visual information, resolving the latent visual information at the small segments of wearable reflective polarizing material substantially comprising the surface of the apparel.

4. The method of claim 1, further comprising the steps of:
the polarization-maintaining reflective surface comprising a woven material at the surface of apparel; and
providing an analyzer in the light path between the surface of apparel and the viewer, whereby light comprising the visual information reflected by the polarization-maintaining reflective material is resolved after reflection by the surface of the apparel and before reaching the viewer so as to be perceptible by a viewer.

5. The method of claim 1, wherein the latent visual information comprises a uniform single color.

6. The method of claim 1, wherein the latent visual information comprises contrast so that to the viewer the apparel appears different at one location on a surface of the apparel from another location on the surface of the apparel.

7. The method of claim 6, wherein the latent visual information comprises an image.

8. The method of claim 7, wherein the latent visual information comprises a pixeled image.

9. The method of claim 1, further comprising the steps of
providing a light source and a pre-polarizer, and a birefringent optical element in the polarized light latent visual information projector;
projecting light from the light source through the pre-polarizer so that the projected light is plane-polarized in a privileged direction of the pre-polarizer;
projecting the plane-polarized light through the birefringent optical element thereby rotating the plane of polarization of the projected light according to the wavelength of the projected light;
selecting the color perceived by the viewer by selecting the relative rotational orientation of the plane of polarization of at least one of the group of elements consisting of the analyzer, the birefringent optical element, and the pre-polarizer with respect to at least one of the other elements in the group.

10. The method of claim 1, further comprising the steps of:
projecting polarized light comprising non-latent visual information onto the polarization-maintaining surface at a polarization angle different from the polarization angle of the latent visual information projected on the same surface;
providing the analyzer near one eye of the viewer for resolving the latent image and blocking the non-latent image, whereby a 3-D effect is perceived.

11. The method of claim 1, further comprising the step of varying the visual information over time.

12. The method of claim 11, further comprising the step of varying the intensity of light comprising the visual information.

13. The method of claim 11, further comprising the step of varying the color of light comprising the visual information.

14. The method of claim 1, wherein the visual information comprises at least one of the group consisting of: a change in intensity of perceived light; a single color; a plurality of colors; a change in color over time; a pattern of light and dark; a pattern of color; a change in a pattern over time; a graphic image; a change in a graphic image over time; a pictorial still image; a motion picture image; a pixeled image; a video image; a live video image; animation; symbols; and an anaglyphic image.

15. A system for producing a visual effect perceived by a viewer as occurring at a surface of apparel worn by a performer, comprising:

a latent polarizer-encoded visual information projector which projects light comprising polarizer-encoded latent visual information, the visual information enabling the visual effect, said light being projected along a light path onto the apparel worn by the performer and reflected therefrom toward a viewer along said light path;

an analyzer positioned so as to impinge upon and be intercepted by the projected light no sooner in the travel of the light along the light path than substantially at the surface of the apparel worn by the performer;

a polarization maintaining reflective material positioned substantially at the surface of the apparel worn by the performer;

whereby the polarizer-encoded latent visual information is resolved by the analyzer no earlier than substantially at the surface of apparel worn by the performer, so that the visual effect is perceived by the viewer at the surface of the apparel but not on other surfaces receiving projected light which do not comprise polarization maintaining reflective material.

16. The system of claim 15, wherein the visual effect comprises at least one of the following: a change in light intensity, a single color; a changing color, multiple colors, a motion picture; a still picture; a live action video picture, symbols; and a anaglyphic image.

17. The system of claim 15, wherein the analyzer and polarization maintaining reflective material are located substantially at the surface of the apparel worn by the performer.

18. The system of claim 15, wherein the analyzer is located at a position separated from the surface of the apparel and between the surface of the apparel and the viewer along the light path.

19. The system of claim 15, wherein the latent polarizer-encoded visual information projector projects at least one color and further comprises:
a light source projecting light along the light path;
a pre-polarizer disposed in the light path which plane polarizes light from the light source in a privileged direction;
a birefringent material disposed in the light path which rotates the plane of polarization of the light from the pre-polarizer through a rotational angle varying with the wavelength of the light, thereby polarization-encoding the light so that different colors are transmitted in different rotational orientations of the planes of polarization;
whereby a color perceived by the viewer is selectable by alteration of the relative orientation of the planes of polarization of the analyzer.

20. The system of claim 15, wherein the polarizer-encoded visual information projector is configured to project a pixeled image, and further comprises:
a light source projecting light along the light path;
a pre-polarizer disposed in the light path which plane polarizes light from the light source in a privileged direction;
a liquid crystal matrix disposed in the light path and configured for pixeled alteration of light traveling through the matrix; so as to polarization-encode the light with an image comprised of individually alterable pixels.

21. A live performance visual effect system configured to provide a visual effect appearing to a viewer to occur on surfaces of a material carried by a performer, comprising:
a latent visual information projector configured to project light comprising polarization-encoded visual information along a light path;
a reflective polarization maintaining material carried by the performer;
an analyzer positioned between the polarization maintaining material and a viewer such that light reflected from the reflective polarization maintaining material travels further along a light path from the material to the viewer and passes through the analyzer;
light comprising latent visual information traveling along the light path from said projector to said reflective polarization maintaining material being reflected therefrom to the viewer through the analyzer and being resolved at the analyzer such that the visual effect is perceived by the viewer to occur at the surface of material carried by the performer and the visual effect is not perceived on adjacent surfaces receiving projected light comprising latent visual information.

22. The system of claim 21, wherein the latent visual information projector further comprises:
a light source emitting light along the light path;
a pre-polarizer impinging upon the light path; and
a birefringent material impinging upon the light path.

23. The system of claim 22, further comprising a projection lens configured for projection of latent visual information onto the reflecting polarization-maintaining material.

24. The system of claim 22, wherein the birefringent material comprises an LC matrix.

25. The system of claim 22, wherein the birefringent material comprises a polymeric resin.

26. The system of claim 25, wherein the birefringent material comprises a polycarbonate polymeric resin.

27. The system of claim 22, wherein the pre-polarizer and the analyzer have relative orthogonal orientations of privileged directions of polarization.

28. The system of claim 21, further comprising a reflective polarizing material comprising the reflective polarization maintaining material and a polarizing material comprising the analyzer, the reflective polarizing material being carried by the performer.

29. The system of claim 28, further comprising a plurality of pieces of reflective polarizing material, each having a privileged direction.

30. The system of claim 29, wherein the plurality of pieces of reflective polarizing material are configured so that privileged directions of the pieces are substantially parallel.

31. The system of claim 29, wherein the plurality of pieces of reflective polarizing material are configured so that privileged directions of the pieces are substantially non-parallel.

32. The system of claim 29, wherein the plurality of pieces of reflective polarizing material are configured as sequins.

33. The system of claim 29, wherein the plurality of pieces of reflective polarizing material are configured so that privileged directions of the pieces are substantially parallel, and are formed from a single scored sheet of reflective polarizing material.

34. The system of claim 29, wherein the plurality of pieces of reflective polarizing material are configured in a woven pattern.

35. The system of claim 34, wherein the plurality of pieces of reflective polarizing material are configured so that privileged directions of the pieces are substantially parallel.

36. The system of claim 34, wherein the plurality of pieces of reflective polarizing material are configured so that privileged directions of the pieces are substantially non-parallel.

37. The system of claim 29, wherein the plurality of pieces of reflective polarizing material are configured as a braid.

38. The system of claim 29, wherein the plurality of pieces of reflective polarizing material are configured so that privileged directions of the pieces are substantially non-parallel and are configured as glitter.

39. The system of claim 38, wherein the plurality of pieces of reflective polarizing material are configured so that a layer of polarization reflective material is sandwiched between two layers of polarizing material.

40. The system of claim 21, wherein the reflective polarizing maintaining material comprises a metallic paint.

41. In a system for visual effects, a method for projecting light including visual information onto a first surface and an adjacent second surface so as to be observable by a viewer as appearing on the first surface and not on the second surface adjacent the first surface, comprising:

provuding a polarized light projector;

providing a first surface comprising a polarization-maintaining reflective surface, projecting polarized light comprising latent visual information along a light path onto the first surface and then by reflection from the first surface further along the light path to the viewer;

projecting polarized light comprising latent visual information onto the second surface adjacent the first surface;

providing an analyzer in the light path which intercepts light traveling along the light path before the light reaches the viewer, the analyzer being positioned no earlier along the light path than substantially at the reflective polarization-maintaining surface; whereby the visual information is resolved and made perceptible to the viewer as appearing at the first surface, and whereby light comprising the visual information reflected by the second surface is not resolved so as to be observed by the viewer as the visual effect.

42. The method of claim 41, further comprising the steps of:

providing the analyzer at the first surface; and resolving the visual information to produce the visual effect at the first surface.

43. The method of claim 42, further comprising the steps of:

providing a wearable reflective polarizing material comprising an analyzer formed of a polarizing material and a polarization maintaining reflective material;

dividing the material into a plurality of small segments; and attaching the small segments to apparel so as to provide a first surface comprising a surface of the apparel substantially comprising attached segments of wearable reflective polarizing material, whereby the surface of the apparel comprises a plurality of small segments individually having an analyzing polarization effect upon light comprising the polarized latent visual information, resolving the latent visual information at the small segments of wearable reflective polarizing material substantially comprising the surface of the apparel.

44. The method of claim 41, further comprising the steps of:

providing a polarization-maintaining reflective material at a first surface comprising a surface of apparel; and providing an analyzer in the light path between the surface of apparel and the viewer, whereby light comprising the visual information reflected by the polarization-maintaining reflective material is resolved after reflection by the surface of the apparel and before reaching the viewer so as to be perceptible by a viewer.

45. The method of claim 41, wherein the latent visual information comprises a uniform single color.

46. The method of claim 41, wherein the latent visual information comprises contrast so that to the viewer the apparel appears different at one location on a surface of the apparel from another location on the surface of the apparel.

47. The method of claim 46, wherein the latent visual information comprises an image.

48. The method of claim 47, wherein the latent visual information comprises a pixeled image.

49. The method of claim 41, further comprising the steps of providing a light source and a pre-polarizer, and a birefringent optical element in the polarized light latent visual information projector;

projecting light from the light source through the pre-polarizer so that the projected light is plane-polarized in a privileged direction of the pre-polarizer;

projecting the plane-polarized light through the birefringent optical element thereby rotating the plane of polarization of the projected light according to the wavelength of the projected light;

selecting the color perceived by the viewer by selecting the relative rotational orientation of the plane of polarization of at least one of the group of elements consisting of the analyzer, the birefringent optical element, and the pre-polarizer with respect to at least one of the other elements in the group.

50. The method of claim 49, wherein the relative rotational orientation of the plane of polarization of the analyzer with respect to that of the pre-polarizer is selected from the group consisting of zero degrees and 90 degrees relative rotational orientation.

51. The method of claim 41, further comprising the step of varying the visual information over time.

52. The method of claim 51, further comprising the step of varying the intensity of light comprising the visual information.

53. The method of claim 51, further comprising the step of varying the color of light comprising the visual information.

54. The method of claim 51, wherein the visual information comprises at least one of the group consisting of: a change in intensity of perceived light; a single color; a plurality of colors; a change in color over time; a pattern of light and dark; a pattern of color; a change in a pattern over time; a graphic image; a change in a graphic image over time; a pictorial still image; a motion picture image; a pixeled image; a video image; a live video image; animation; symbols; and an anaglyphic image.

55. The system of claim 41, wherein the latent visual information projector further comprises:

a light source emitting light along the light path;

a pre-polarizer impinging upon the light path; and a birefringent material impinging upon the light path.

56. The system of claim 55, further comprising a projection lens configured for projection of latent visual information onto the reflecting polarization-maintaining material.

57. The system of claim 55, wherein the birefringent material comprises an LC matrix.

58. The system of claim 55, wherein the birefringent material comprises a polymeric resin.

59. The system of claim 58, wherein the birefringent material comprises a polycarbonate polymeric resin.

60. The system of claim 55, wherein the pre-polarizer and the analyzer have relative orthogonal orientations of privileged directions of polarization.

61. The system of claim 41, further comprising a reflective polarizing material comprising the reflective polarization maintaining material and a polarizing material comprising the analyzer, the reflective polarizing material being carried by the performer.

62. A live performance visual effect system configured to provide a visual effect appearing to a viewer to occur on a first surface but not on an adjacent second surface, comprising:

a latent visual information projector configured to project light comprising polarization-encoded visual information along a light path to a first surface and an also project said light onto an adjacent second surface;

a reflective polarization maintaining material comprising said first surface;

an analyzer positioned between the polarization maintaining material and a viewer such that light reflected from the reflective polarization maintaining material travels further along a light path from the material to the viewer and passes through the analyzer; light comprising latent visual information traveling along the light path from said projector to said reflective polarization material being reflected therefrom to the viewer through the analyzer and being resolved at the analyzer such that the visual effect is perceived by the viewer to occur at the first surface, but wherein the visual effect is not perceived by the viewer to occur on the second surface receiving projected light comprising latent visual information.

63. The system of claim 62, wherein the analyzer is located substantially at the first surface.

64. The system of claim 62, wherein the latent visual information projector further comprises:

a light source emitting light along the light path;

a pre-polarizer impinging upon the light path; and a birefringent material impinging upon the light path.

65. The system of claim 62, further comprising a projection lens configured for projection of latent visual information onto the first and second surfaces.

66. The system of claim 64, wherein the birefringent material comprises an LC matrix.

67. The system of claim 64, wherein the birefringent material comprises a polymeric resin.

68. The system of claim 67, wherein the birefringent material comprises a polycarbonate polymeric resin.

69. The system of claim 64, wherein the pre-polarizer and the analyzer have relative orthogonal orientations of privileged directions of polarization.

70. The system of claim 62, further comprising a reflective polarizing material comprising the reflective polarization maintaining material and a polarizing material comprising the analyzer, the reflective polarizing material being configured to be carried by a performer in a live performance.

71. The system of claim 62, further comprising a plurality of pieces of reflective polarizing material, each having a privileged direction.

72. The system of claim 71, wherein the plurality of pieces of reflective polarizing material are configured so that privileged directions of the pieces are substantially parallel.

73. The system of claim 71, wherein the plurality of pieces of reflective polarizing material are configured so that privileged directions of the pieces are substantially non-parallel.

74. The system of claim 71, wherein the plurality of pieces of reflective polarizing material are configured as sequins.

75. The system of claim 71, wherein the plurality of pieces of reflective polarizing material are configured in a woven pattern.

76. The system of claim 75, wherein the plurality of pieces of reflective polarizing material are configured so that privileged directions of the pieces are substantially parallel.

77. The system of claim 75, wherein the plurality of pieces of reflective polarizing material are configured so that privileged directions of the pieces are substantially non-parallel.

78. The system of claim 71, wherein the plurality of pieces of reflective polarizing material are configured as a braid.

79. The system of claim 71, wherein the plurality of pieces of reflective polarizing material are configured so that privileged directions of the pieces are substantially non-parallel and are configured as glitter.

80. The system of claim 79, wherein the plurality of pieces of reflective polarizing material are configured so that a layer of polarization reflective material is sandwiched between two layers of polarizing material.

81. The system of claim 62, wherein the reflective polarization maintaining material comprises a metallic paint.

82. The method of claim 41, further comprising the steps of:

projecting polarized light comprising non-latent visual information onto the polarization-maintaining surface at a polarization angle different from the polarization angle of the latent visual information projected on the same surface;

providing the analyzer near one eye of the viewer for resolving the latent image and blocking the non-latent image, whereby a 3-D effect is perceived.

* * * * *